(12) United States Patent
Luipold

(10) Patent No.: US 10,140,017 B2
(45) Date of Patent: Nov. 27, 2018

(54) GRAPHICAL KEYBOARD APPLICATION WITH INTEGRATED SEARCH

(71) Applicant: Google Inc., Mountain View, CA (US)

(72) Inventor: Heather Luipold, Mountain View, CA (US)

(73) Assignee: Google LLC, Mountain View, CA (US)

(*) Notice: Subject to any disclaimer, the term of this patent is extended or adjusted under 35 U.S.C. 154(b) by 0 days.

(21) Appl. No.: 15/134,319

(22) Filed: Apr. 20, 2016

(65) Prior Publication Data

US 2017/0308291 A1    Oct. 26, 2017

(51) Int. Cl.
| | |
|---|---|
| G06F 3/0486 | (2013.01) |
| G06F 3/0488 | (2013.01) |
| G06F 17/30 | (2006.01) |
| G06F 3/0482 | (2013.01) |
| G06F 3/0484 | (2013.01) |
| H04L 29/08 | (2006.01) |

(52) U.S. Cl.
CPC ........ *G06F 3/04886* (2013.01); *G06F 3/0482* (2013.01); *G06F 3/04842* (2013.01); *G06F 3/04883* (2013.01); *G06F 17/3053* (2013.01); *G06F 17/3056* (2013.01); *G06F 17/3097* (2013.01); *G06F 17/30477* (2013.01); *G06F 17/30554* (2013.01); *G06F 17/30864* (2013.01); *G06F 17/30973* (2013.01); *H04L 67/10* (2013.01); *H04L 67/34* (2013.01)

(58) Field of Classification Search
CPC .............. G06F 3/0482; G06F 3/04886; G06F 3/04883; G06F 17/3056; G06F 17/30554
See application file for complete search history.

(56) References Cited

U.S. PATENT DOCUMENTS

| | | |
|---|---|---|
| 6,104,397 A | 8/2000 | Ryan et al. |
| 7,599,847 B2 | 10/2009 | Block et al. |

(Continued)

FOREIGN PATENT DOCUMENTS

EP    2940605 A1    11/2015

OTHER PUBLICATIONS

"Microsoft Hub Keybaord comes to Android with all things Microsoft in Tow" ("Hub" Feb. 23, 2016 pp. 1-2).*

(Continued)

*Primary Examiner* — Sherrod L Keaton
(74) *Attorney, Agent, or Firm* — Shumaker & Sieffert, P.A.

(57) ABSTRACT

A computing device is described that includes a processor a memory storing at least a keyboard application, and a presence-sensitive display. The one or more processors execute the keyboard application to output a graphical keyboard including a plurality of keys and a search element, receive an indication of a selection of the search element, and, responsive to receiving the indication of the selection of the search element, output, within the graphical keyboard, a query suggestion region including one or more suggested search queries. The keyboard application may also determine, based on an indication of a user input detected by the computing device, a search query, invoke, based on the search query, a search, responsive to invoking the search, receive search results, and output, within the graphical keyboard, a graphical indication of at least a portion of the search results.

21 Claims, 5 Drawing Sheets

(56) References Cited

U.S. PATENT DOCUMENTS

| | | | |
|---|---|---|---|
| 8,370,143 B1 | 2/2013 | Coker | |
| 8,484,573 B1 | 7/2013 | Zhai et al. | |
| 8,621,379 B2 | 12/2013 | Davydov | |
| 8,650,210 B1 | 2/2014 | Cheng et al. | |
| 8,706,750 B2 | 4/2014 | Hansson et al. | |
| 8,745,018 B1* | 6/2014 | Singleton | G06F 17/30899 707/705 |
| 8,789,144 B2 | 7/2014 | Mazzaferri et al. | |
| 8,914,451 B2 | 12/2014 | Langlois et al. | |
| 9,043,196 B1 | 5/2015 | Leydon et al. | |
| 9,086,775 B1 | 7/2015 | Tse et al. | |
| 9,462,633 B2 | 10/2016 | Shim et al. | |
| 9,483,175 B2 | 11/2016 | Wagner | |
| 9,720,955 B1 | 8/2017 | Cao et al. | |
| 2005/0234883 A1 | 10/2005 | Szeto et al. | |
| 2006/0048076 A1 | 3/2006 | Vronay et al. | |
| 2006/0294189 A1 | 12/2006 | Natarajan et al. | |
| 2007/0088686 A1 | 4/2007 | Hurst-Hiller et al. | |
| 2007/0130276 A1 | 6/2007 | Zhang et al. | |
| 2007/0300177 A1 | 12/2007 | Karas et al. | |
| 2008/0021884 A1 | 1/2008 | Jones et al. | |
| 2008/0122796 A1 | 5/2008 | Jobs et al. | |
| 2008/0201434 A1 | 8/2008 | Holmes et al. | |
| 2008/0244446 A1 | 10/2008 | LeFavre et al. | |
| 2009/0006543 A1 | 1/2009 | Smit | |
| 2010/0277424 A1 | 11/2010 | Chang et al. | |
| 2010/0299594 A1 | 11/2010 | Zalewski et al. | |
| 2010/0325100 A1 | 12/2010 | Forstall et al. | |
| 2011/0087990 A1 | 4/2011 | Ng et al. | |
| 2011/0112824 A1 | 5/2011 | Sayers et al. | |
| 2011/0191321 A1 | 8/2011 | Gade et al. | |
| 2011/0191364 A1 | 8/2011 | Lebeau et al. | |
| 2011/0201387 A1 | 8/2011 | Paek et al. | |
| 2011/0221678 A1 | 9/2011 | Davydov et al. | |
| 2012/0036469 A1 | 2/2012 | Suraqui | |
| 2012/0102549 A1 | 4/2012 | Mazzaferri et al. | |
| 2012/0124071 A1 | 5/2012 | Gebhard et al. | |
| 2012/0124519 A1 | 5/2012 | Uphoff et al. | |
| 2012/0127083 A1 | 5/2012 | Kushler et al. | |
| 2012/0158644 A1 | 6/2012 | Mital et al. | |
| 2012/0158732 A1 | 6/2012 | Mital et al. | |
| 2012/0254227 A1 | 10/2012 | Heck et al. | |
| 2012/0256840 A1 | 10/2012 | Razzaghi | |
| 2013/0018913 A1 | 1/2013 | Jones et al. | |
| 2013/0120267 A1 | 5/2013 | Pasquero et al. | |
| 2013/0246913 A1 | 9/2013 | McCormack et al. | |
| 2013/0285913 A1 | 10/2013 | Griffin et al. | |
| 2013/0297317 A1 | 11/2013 | Lee et al. | |
| 2013/0325844 A1 | 12/2013 | Plaisant | |
| 2014/0002363 A1 | 1/2014 | Griffin et al. | |
| 2014/0115070 A1 | 4/2014 | Virtanen et al. | |
| 2014/0172814 A1 | 6/2014 | Yuen et al. | |
| 2014/0201676 A1 | 7/2014 | Du et al. | |
| 2014/0223372 A1 | 8/2014 | Dostie et al. | |
| 2014/0229847 A1 | 8/2014 | Park | |
| 2014/0282136 A1 | 9/2014 | Marantz et al. | |
| 2014/0282203 A1 | 9/2014 | Pasquero et al. | |
| 2014/0330769 A1 | 11/2014 | Nguyen et al. | |
| 2014/0358940 A1 | 12/2014 | Gupta et al. | |
| 2015/0006505 A1 | 1/2015 | Plakhov et al. | |
| 2015/0100537 A1 | 4/2015 | Grieves et al. | |
| 2015/0113435 A1 | 4/2015 | Phillips | |
| 2015/0121286 A1 | 4/2015 | Kim et al. | |
| 2015/0201065 A1 | 7/2015 | Shim et al. | |
| 2015/0222586 A1 | 8/2015 | Ebersman et al. | |
| 2015/0242086 A1 | 8/2015 | Mindlin | |
| 2015/0317316 A1 | 11/2015 | Ghanekar et al. | |
| 2015/0331605 A1 | 11/2015 | Park et al. | |
| 2015/0370434 A1 | 12/2015 | Kritt et al. | |
| 2016/0006856 A1 | 1/2016 | Bruno | |
| 2016/0034977 A1 | 2/2016 | Bhaowal et al. | |
| 2016/0085773 A1 | 3/2016 | Chang et al. | |
| 2016/0124926 A1 | 5/2016 | Fallah | |
| 2016/0224524 A1 | 8/2016 | Kay et al. | |
| 2016/0330150 A1 | 11/2016 | Joe et al. | |
| 2016/0334988 A1 | 11/2016 | Kim et al. | |
| 2017/0102870 A1* | 4/2017 | Won | G06F 3/0481 |
| 2017/0102871 A1 | 4/2017 | Won | |
| 2017/0308273 A1 | 10/2017 | Choi | |
| 2017/0308291 A1 | 10/2017 | Luipold | |
| 2017/0308292 A1 | 10/2017 | Choi | |
| 2017/0308586 A1 | 10/2017 | Mohsin et al. | |
| 2017/0308587 A1 | 10/2017 | Nagel et al. | |
| 2017/0310616 A1 | 10/2017 | Cao et al. | |

OTHER PUBLICATIONS

"Microsoft Hub Keybaord comes to Android with all things Microsoft in Tow" (Feb. 23, 2016 pp. 1-2).*

Chansanchai, "Hub Keyboard app from Microsoft Garage makes it easy to multitask from one mobile screen", retrieved from the Internet: <https://blogs.microsoft.com/firehose/2016/02/23/hub-keyboard-app-from-microsoft-garage-makes-it-easy-to-multitask-from-one-mobile-screen/#sm.0001ekq05s8cid6jpo52ovcbjyjie>, Feb. 23, 2016, 6 pp.

U.S. Appl. No. 15/133,291 by Jing Cao, filed Apr. 20, 2016.

U.S. Appl. No. 15/134,243, by Muhammad Mohsin, filed Apr. 20, 2016.

U.S. Appl. No. 15/134,029 by Min-sang Choi, filed Apr. 20, 2016.

U.S. Appl. No. 15/134,323 by Jens Nagel, filed Apr. 20, 2016.

Whitwam, "Microsoft Hub Keyboard Comes to Android With All Things Microsoft in Tow," retrieved from http://www.androidpolice.com/2016/02/23/microsoft-hub-keyboard-comes-to-android-with-all-things-microsoft-in-tow/, Feb. 23, 2016, 5 pp.

U.S. Appl. No. 15/332,409, by Muhammad Mohsin et al., filed Oct. 24, 2016.

International Search Report and Written Opinion of International Application No. PCT/US2016/068387, dated Mar. 2, 2017, 13 pp.

McAlone, "Slash is the best iPhone Keyboard—Business Insider," retrieved from http://www.businessinsider.com/slash-is-the-best-iphone-keyboard-2015-9, Sep. 22, 2015, 26 pp.

U.S. Appl. No. 15/134,029, by Ming-sang Choi, filed Apr. 20, 2016.

U.S. Appl. No. 15/332,513, by Heather Luipold, filed Oct. 24, 2016.

Office Action from U.S. Appl. No. 15/332,513, dated Jan. 13, 2017, 13 pp.

Response to Office Action dated Jan. 13, 2017, from U.S. Appl. No. 15/332,513, filed Apr. 13, 2017, 11 pp.

U.S. Appl. No. 15/289,661, by Jing Cao, filed Oct. 10, 2016.

U.S. Appl. No. 15/299,027, by Ming-sang Choi, filed Oct. 20, 2016.

U.S. Appl. No. 15/246,091, by Nicholas Chi-Yuen Kong, filed Aug. 24, 2016.

Final Office Action from U.S. Appl. No. 15/332,513, dated Jun. 2, 2017, 16 pp.

Response to Final Office Action dated Jun. 2, 2017, from U.S. Appl. No. 15/332,513, filed Sep. 5, 2017, 12 pp.

StackExchange (2013), "How to provide autocomplete and autosuggest on the same search box at the same time", retrieved from: http://ux.stackexchange.com/questions/40104/how-to-provide-autocomplete-and-autosuggest-on-the-same-search-box-at-the-same-t accessed on Aug. 30, 2017, 2 pp.

Office Action from U.S. Appl. No. 15/332,513, dated Nov. 21, 2017, 17 pp.

Combined Search and Examination Report from counterpart Great Britain Application No. 1706161.5, dated Oct. 2, 2017, 9 pp.

Response to Examination Report dated Sep. 29, 2017, from counterpart Great Britain Application No. 1706161.5, filed Apr. 12, 2018, 18 pp.

\* cited by examiner

GRAPHICAL KEYBOARD APPLICATION WITH INTEGRATED SEARCH

BACKGROUND

Despite being able to simultaneously execute several applications, some mobile computing devices can only present a graphical user interface (GUI) of a single application, at a time. To interact with multiple applications at once, a user of a mobile computing device may have to switch between different application GUIs. For example, a user of a mobile computing device may have to cease entering text in a messaging application and provide input to cause the device to toggle to a search application to search for a particular piece of information to use when composing a message or otherwise entering text.

SUMMARY

In one example, a method includes outputting, by keyboard application executing at a computing device, for display, a graphical keyboard including a plurality of keys and a search element, receiving, by the keyboard application, an indication of a selection of the search element, and, responsive to receiving the indication of the selection of the search element, outputting, by the keyboard application, for display within the graphical keyboard, a query suggestion region including one or more suggested search queries. The method may also include determining, by the keyboard application, based on an indication of a user input detected by the computing device, a search query, invoking, by the keyboard application and based on the search query, a search, responsive to invoking the search, receiving, by the keyboard application, search results, and outputting, by the keyboard application, for display within the graphical keyboard and in place of at least a portion of the plurality of keys, a graphical indication of at least a portion of the search results.

In another example, a computing device includes one or more processors, a memory storing one or more applications including a keyboard application, and a presence-sensitive display. The one or more processors execute the keyboard application to output, for display by the presence-sensitive display, a graphical keyboard including a plurality of keys and a search element, receive an indication of a selection of the search element, and responsive to receiving the indication of the selection of the search element, output, for display by the presence-sensitive display and within the graphical keyboard, a query suggestion region including one or more suggested search queries. The one or more processors may also execute the keyboard application to determine, based on an indication of a user input detected by the computing device, a search query, invoke, based on the search query, a search, responsive to invoking the search, receive search results, and output, for display by the presence-sensitive display, within the graphical keyboard and in place of at least a portion of the plurality of keys, a graphical indication of at least a portion of the search results.

In another example, a computer-readable storage medium encoded with instructions that, when executed, cause one or more processors of a computing device to output, for display, a graphical keyboard including a plurality of keys and a search element, receive an indication of a selection of the search element, and responsive to receiving the indication of the selection of the search element, output, for display within the graphical keyboard, a query suggestion region including one or more suggested search queries. The instructions may further cause the one or more processors to determine, based on an indication of a user input detected by the computing device, a search query, invoke, based on the search query, a search, responsive to invoking the search, receive search results, and output, for display within the graphical keyboard and in place of at least a portion of the plurality of keys, a graphical indication of at least a portion of the search results.

The details of one or more examples are set forth in the accompanying drawings and the description below. Other features, objects, and advantages of the disclosure will be apparent from the description and drawings, and from the claims.

DETAILED DESCRIPTION

Figure 1:
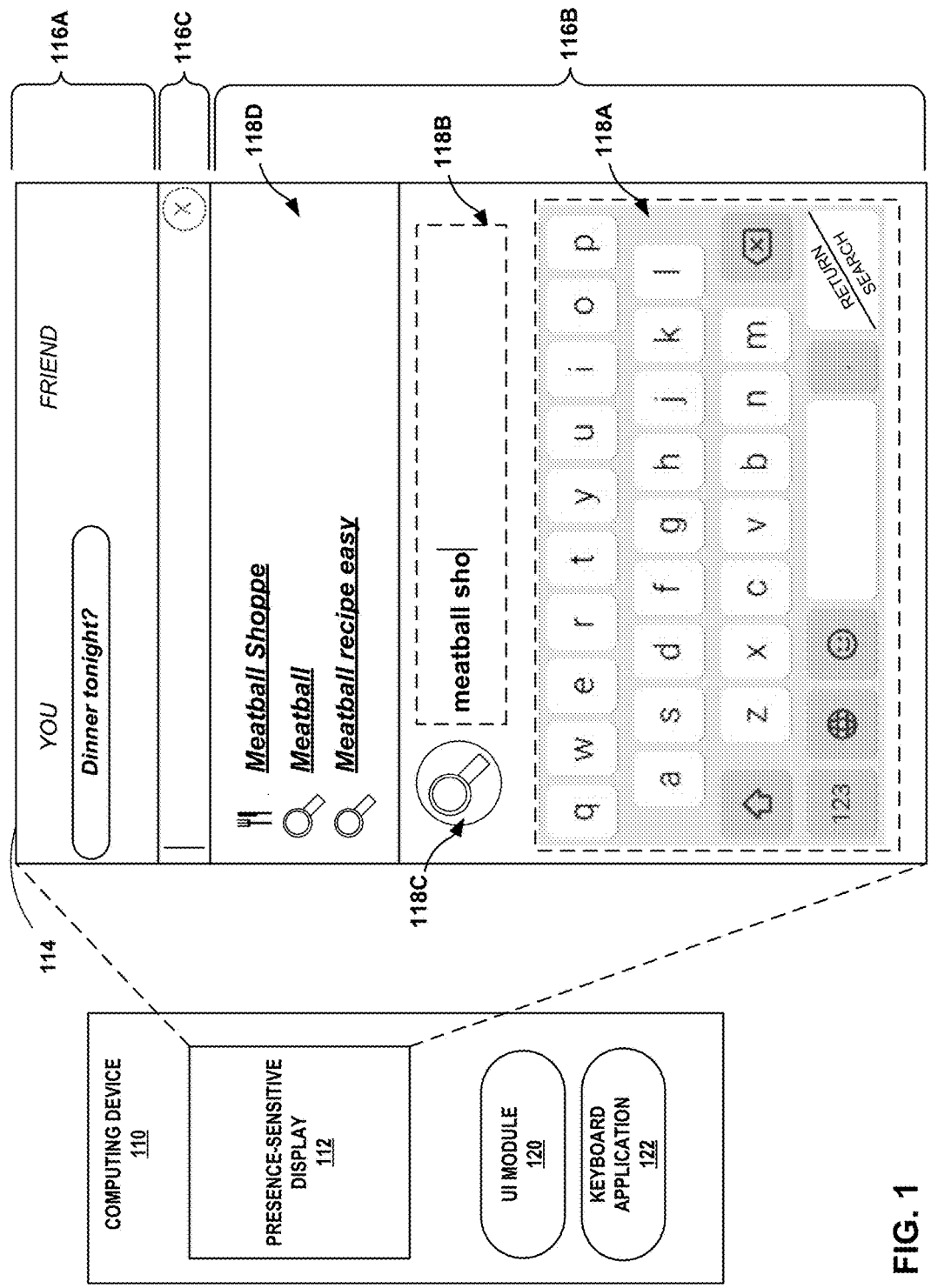
FIG. 1 is a conceptual diagram illustrating an example computing device that is configured to present a graphical keyboard with integrated search features, in accordance with one or more aspects of the present disclosure.

In general, this disclosure is directed to techniques for enabling a keyboard application, executing at a computing device, to perform a search and display results of the search within a graphical keyboard of the keyboard application. For example, a user may interact with a graphical keyboard that is presented, by the keyboard application, at a presence-sensitive screen (e.g., a touchscreen). The interaction may be in association with a communication application or the like, distinct from a search application, for example as part of a messaging or texting application graphical user interface (GUI). If the user is interested in conducting a search, the user may select a suggested search query or provide a search query and cause the keyboard application to initiate the search (which may optionally be performed on the content stored on the computing device and/or by a search engine on content stored remote of the computing device). In some examples, the computing device may present the search results as part of or in place of a portion of the keyboard (e.g., in place of the graphical keys) within or by the keyboard application.

By providing a GUI that includes a graphical keyboard with integrated search capabilities, an example computing device may provide a way for a user to quickly obtain search results that are relevant to the input that the user has already provided at the graphical keyboard without having to switch between several different applications and application GUIs or re-type text already input at the graphical keyboard. In this way, techniques of this disclosure may reduce the amount of time and the number of user inputs required to obtain search results, which may simplify the user experience and may reduce power consumption of the computing device.

Throughout the disclosure, examples are described where an application, a computing device and/or a computing system analyzes information (e.g., text being entered at a graphical keyboard, context, locations, speeds, search queries, etc.) associated with a computing device and a user of a computing device, only if the user of the computing device provides permission to analyze the information. For example, in situations discussed below, before an application, computing device or computing system can collect or may make use of information associated with a user, the user may be provided with an opportunity to provide input to control whether the application, computing device and/or computing system can collect and make use of user information (e.g., information about text being entered at a graphical keyboard, etc.), or to dictate whether and/or how to the application, device and/or system may receive content that may be relevant to the user. In addition, certain data may be treated in one or more ways before it is stored or used by the application, computing device and/or computing system, so that personally-identifiable information is removed. For example, a user's identity may be treated so that no personally identifiable information can be determined about the user, or a user's geographic location may be generalized where location information is obtained (such as to a city, ZIP code, or state level), so that a particular location of a user cannot be determined. Thus, the user may have control over how information is collected about the user and used by the computing device and computing system.

FIG. 1 is a conceptual diagram illustrating an example computing device 110 that is configured to output a graphical keyboard with integrated search features, in accordance with one or more aspects of the present disclosure. Computing device 110 may represent a mobile device, such as a smart phone, a tablet computer, a laptop computer, computerized watch, computerized eyewear, computerized gloves, or any other type of portable computing device. Additional examples of computing device 110 include desktop computers, televisions, personal digital assistants (PDA), portable gaming systems, media players, e-book readers, mobile television platforms, automobile navigation and entertainment systems, vehicle (e.g., automobile, aircraft, or other vehicle) cockpit displays, or any other types of wearable and non-wearable, mobile or non-mobile computing devices that may output a graphical keyboard for display.

Computing device 110 includes a presence-sensitive display (PSD) 112, a user interface (UI) module 120, and a keyboard application 122. Modules 120 and 122 may perform operations described using software, hardware, firmware, or a mixture of hardware, software, and firmware residing in and/or executing at computing device 110. For example, one or more processors of computing device 110 may execute instructions that are stored at a memory or other non-transitory storage medium of computing device 110 to perform the operations of modules 120 and 122. Computing device 110 may execute modules 120 and 122 as virtual machines executing on underlying hardware. As other examples, modules 120 and 122 may execute as one or more services of an operating system or computing platform, or modules 120 and 122 may execute as one or more executable programs at an application layer of a computing platform.

PSD 112 of computing device 110 may function as respective input and/or output devices for computing device 110. PSD 112 may be implemented using various technologies. For instance, PSD 112 may function as an input devices using presence-sensitive input screens, such as resistive touchscreens, surface acoustic wave touchscreens, capacitive touchscreens, projective capacitance touchscreens, pressure sensitive screens, acoustic pulse recognition touchscreens, or another presence-sensitive display technology. PSD 112 may also function as output (e.g., display) devices using any one or more display devices, such as liquid crystal displays (LCD), dot matrix displays, light emitting diode (LED) displays, organic light-emitting diode (OLED) displays, e-ink, or similar monochrome or color displays capable of outputting visible information to a user of computing device 110.

PSD 112 may detect input (e.g., touch and non-touch input) from a user of computing device 110. PSD 112 may detect input by detecting one or more gestures from a user (e.g., the user touching, pointing, and/or swiping at or near one or more locations of PSD 112 with a finger or a stylus pen). PSD 112 may output information to a user in the form of a user interface (e.g., user interface 114), which may be associated with functionality provided by computing device 110. Such user interfaces may be associated with computing platforms, operating systems, applications, and/or services executing at or accessible from computing device 110 (e.g., electronic message applications, chat applications, Internet browser applications, mobile or desktop operating systems, social media applications, electronic games, and other types of applications). For example, PSD 112 may present user interface 114 which, as shown in FIG. 1, is a graphical user interface of a chat application executing at computing device 110 and includes various graphical elements displayed at various locations of PSD 112.

Although shown in FIG. 1 as a chat user interface, user interface 114 may be any graphical user interface that includes (or accesses the services of) a graphical keyboard with integrated search features. In the example of FIG. 1, user interface 114 includes an output region 116A, a graphical keyboard 116B, and a text edit region 116C. A user of computing device 110 may provide input at graphical keyboard 116B to produce textual characters within edit region 116C that form the content of the electronic messages displayed within output region 116A. The messages displayed within output region 116A form a chat conversation between a user of computing device 110 and a user of a different computing device.

In some examples, region 116A is a user interface for a first application that is separate and distinct from a keyboard application that provides the graphical keyboard 116B. In such examples, the first application utilizes the services of the keyboard application for certain input and output functions, including text and symbol entry, text and symbol display, text and symbol entry editing, attachment selection, process invocation (such as spell checking, font and style changes, etc.), transmission and receipt controls, etc. Furthermore, the keyboard application can implement search functionality, and in some examples provide that search functionality, or results of that search functionality, to the first application.

UI module 120 manages user interactions with PSD 112 and other components of computing device 110. In other words, UI module 120 may act as an intermediary between various components of computing device 110 to make determinations based on user input detected by PSD 112 and generate output at PSD 112, e.g., in response to the user input. UI module 120 may receive instructions from an application, service, platform, or other module of computing device 110 to cause PSD 112 to output a user interface (e.g., user interface 114). UI module 120 may manage inputs received by computing device 110 as a user views and interacts with the user interface presented at PSD 112 and update the user interface in response to receiving additional instructions from the application, service, platform, or other module of computing device 110 that is processing the user input.

Keyboard application 122 represents an application, service, or component executing at or accessible to computing device 110 that provides computing device 110 with a graphical keyboard having integrated search features. Keyboard application 122 may switch between operating in text-entry mode in which keyboard application 122 functions similar to a traditional graphical keyboard, or search mode in which keyboard application 122 performs various integrated search functions or interfaces with one or more search applications or functionality. Keyboard application 122 may, for example, receive search queries or output search results for display in place of at least a portion of graphical keyboard 116B (e.g., in place of one or more keys of plurality of graphical keys 118A).

In some examples, keyboard application 122 may be a stand-alone application, service, or module executing at computing device 110. In other examples, keyboard application 122 may be a sub-component or extension acting as a service for other applications or device functionality. For example, keyboard application 122 may be integrated into a chat or messaging application executing at computing device 110. As another example, keyboard application 122 may be a stand-alone application or subroutine that is invoked by an application or operating platform of computing device 110 any time an application or operating platform requires graphical keyboard input functionality. In some examples, computing device 110 may download and install keyboard application 122 from an application repository of a service provider (e.g., an online application store accessible via the Internet). In other examples, keyboard application 122 may be preloaded during production of computing device 110.

When operating in text-entry mode, keyboard application 122 of computing device 110 may perform traditional, graphical keyboard operations used for text-entry, such as: generating a graphical keyboard layout including plurality of graphical keys 118A for display at PSD 112, mapping detected inputs at PSD 112 to selections of graphical keys 118A, determining characters based on selected graphical keys 118A, and predicting or autocorrecting words and/or phrases based on the characters determined from selected graphical keys 118A.

Graphical keyboard 116B includes graphical elements displayed as graphical keys 118A. Keyboard application 122 may output information to UI module 120 that specifies the layout of graphical keyboard 116B within user interface 114. For example, the information may include instructions that specify locations, sizes, colors, characters, and other characteristics of graphical keys 118A. Based on the information received from keyboard application 122, UI module 120 may cause PSD 112 display graphical keyboard 116B as part of user interface 114.

Each key of graphical keys 118A may be associated with one or more respective characters (e.g., a letter, number, punctuation, or other character) displayed within the key. A user of computing device 110 may provide input at locations of PSD 112 at which one or more of graphical keys 118A are displayed to input content (e.g., characters, search results, etc.) into text edit region 116C (e.g., for composing messages that are sent and displayed within output region 116A or for inputting a search query that computing device 110 executes from within graphical keyboard 116B). Keyboard application 122 may receive information from UI module 120 indicating locations associated with input detected by PSD 112 that are relative to the locations of each of the graphical keys. Using a spatial and/or language model, keyboard application 122 may translate the inputs to selections of keys and characters, words, and/or phrases.

For example, PSD 112 may detect user input as a user of computing device 110 provides inputs at or near a location of PSD 112 where PSD 112 presents graphical keys 118A. UI module 120 may receive, from PSD 112, an indication of the user input detected by PSD 112 and output, to keyboard application 122, information about the user input. Information about the user input may include an indication of one or more touch events (e.g., locations and other information about the input) detected by PSD 112.

Based on the information received from UI module 120, keyboard application 122 may map detected user inputs at PSD 112 to selections of graphical keys 118A, determine characters based on selected graphical keys 118A, and predict or autocorrect words and/or phrases determined based on the characters associated with the selected graphical keys 118A. For example, keyboard application 122 may include a spatial model that may determine, based on the locations of keys 118A and the information about the input, the most likely one or more graphical keys 118A being selected. Responsive to determining the most likely one or more graphical keys 118A being selected, keyboard application 122 may determine one or more characters, words, and/or phrases. For example, each of the one or more graphical keys 118A being selected from a user input at PSD 112 may represent an individual character or a keyboard operation. Keyboard application 122 may determine a sequence of characters selected based on the one or more selected graphical keys 118A. In some examples, keyboard application 122 may apply a language model to the sequence of characters to determine one or more likely candidate letters, morphemes, words, and/or phrases that a user is trying to input based on the selection of graphical keys 118A.

Keyboard application 122 may send the sequence of characters and/or candidate words and phrases to UI module 120 and UI module 120 may cause PSD 112 to present the characters and/or candidate words determined from a selection of one or more graphical keys 118A as text within edit region 116C. In some examples, when functioning as a traditional keyboard for performing text-entry operations, and in response to receiving a user input at graphical keys 118A (e.g., as a user is typing at graphical keyboard 116B to enter text within edit region 116C), keyboard application 122 may cause UI module 120 to display the candidate words and/or phrases as one or more selectable spelling corrections and/or selectable word or phrase suggestions within suggestion region 118B.

In addition to performing traditional, graphical keyboard operations used for text-entry, keyboard application 122 of computing device 110 also provides integrated search capability. That is, rather than requiring a user of computing device 110 to navigate away from user interface 114 which provides graphical keyboard 116B and output region 116A (e.g., to a different application or service executing at or accessible from computing device 110), keyboard application 122 may operate in search mode in which keyboard application 122 may execute search operations and present search results in one or more possible locations and formats, such as within the same region of PSD 112 at which graphical keyboard 116B is displayed. Keyboard module 122 may include routines for executing search functions and/or may include interfaces for communicating with a separate search engine or resource that receives search parameters from keyboard module 122 and returns search results. Search functionality invoked by keyboard module 122 may search memory of device 110 and/or external memory.

As indicated above, keyboard application 122 may execute as a stand-alone application, service, or module executing at computing device 110 or as a single, integrated sub-component thereof. For example, if keyboard application 122 is a stand-alone application or subroutine that is invoked by an application or operating platform of computing device 110 any time an application or operating platform requires graphical keyboard input functionality, keyboard application 122 may provide the invoking application or operating platform with text-entry capability as well as search capability.

Keyboard application 122 may further operate in search mode. In some examples, when operating in search mode, keyboard application 122 may cause graphical keyboard 116B to include search element 118C. Search element 118C represents a selectable element of graphical keyboard 116B for invoking one or more of the various search features of graphical keyboard 116B, such as invoking the search mode. For example, by selecting search element 118C (e.g., by tapping or gesturing at a location or within a region of PSD 112 at which search element 118C is displayed), a user can cause computing device 110 to invoke the various integrated search features without the user having to expressly navigate to a separate application, service, or other feature executing at or accessible from computing device 110.

UI module 120 may output information to keyboard application 122 indicating that a user of computing device 110 may have selected search element 118C. Responsive to determining that search element 118C was selected, keyboard application 122 may transition to operating in search mode. In some examples, while keyboard application 122 is operating in search mode, keyboard application 122 may still enable text entry via graphical keys 118A.

Keyboard application 122 may reconfigure graphical keyboard 116B to execute search features as opposed to operations that are primarily attributed to text entry to text edit region 116C. For example, responsive to receiving a selection of search element 118C, keyboard application 122 may modify graphical keyboard 116B to include query suggestion region 118D, which may include one or more suggested queries. Keyboard application 122 may configure suggestion region 118B to present suggested content (e.g., predicted search queries, predicted emoticons or so called "emojis", or other suggested content) as selectable elements within suggestion region 118B instead of predicted characters, words or phrases or other primarily linguistic information that keyboard application 122 derives from a language model, lexicon, or dictionary. In other words, rather than providing spelling or word suggestions from a dictionary within suggestion region 118B, computing device 110 may present, within suggestion region 118B, suggested search related content that computing device 110 determines may assist a user in providing input related to electronic communications. In examples where keyboard application 122 presented a suggested search query within suggestion region 118B prior to selection of search element 118C, after receiving the selection of search element 118C, keyboard application 122 may include the suggested search query as one of the suggested search queries within query suggestion region 118D.

As another example, in response to receiving an indication that a user may have selected search element 118C, keyboard application 122 may configure suggestion region 118B to present search queries input using graphical keys 118A in addition to or instead of predicted characters, words or phrases or other primarily linguistic information that keyboard application 122 derives from a language model, lexicon, or dictionary. In other words, in some instances, rather than providing spelling or word suggestions from a dictionary within suggestion region 118B, computing device 110 may present, within suggestion region 118B, search queries input using graphical keys 118A.

In some examples, keyboard application 122 may configure suggestion region 118B to display search queries with a different format than predicted characters, words or phrases so that a user may visually distinguish search queries from predicted characters, words or phrases. For example, keyboard application 122 may configure suggestion region 118B to display search queries with a predetermined text color, font, font size, etc., or adjacent to or within a distinguishing user interface element, such as a text box, to visually differentiate a search query from predicted characters, words or phrases.

Keyboard application 122 may, instead of or in addition to configuring suggestion 118B to present search queries, include query suggestion region 118D within graphical keyboard 116B. Suggestion region 118D may include suggested search queries as selectable elements above the graphical keys 118A. In other words, keyboard application 122 may in some examples configure the graphical keyboard 116B to include query suggestion region 118D positioned between edit region 116C and graphical keys 118A. In the example shown in FIG. 1, the query suggestion region 118D is also positioned near (e.g., adjacent to, above, below, on either side of, etc.) the suggestion region 118B, which may have input focus. In some examples where the user interface 114 may be configured differently, the query suggestion region 118D may be positioned between the graphical keys 118A and the edit region 116C, including in an example where the query suggestion region is positioned below the graphical keys and above the edit region. In still further examples, the query suggestion region may be positioned between the suggestion region 118B and the edit region 116C, including an example where the query suggestion region is positioned below the suggestion region and above the edit region. Other alternative arrangements of the graphical user interface are possible, including arrangements where the query suggestion region is not positioned between the graphical keys and the edit region, or between the suggestion region and the edit region.

In some examples, input detected by the computing device 110 may be output to one or more specific user interface component(s) that are designated as having input focus. For instance, as PSD 112 detects user input at or near a location of PSD 112 where PSD 112 presents graphical keyboard 116B, UI module 120 may receive an indication of input and may output to keyboard application 122 information about the input. In some examples where keyboard application 122 determines that the user is providing input at graphical keys 118A that correspond to a string of characters, keyboard application 122 may cause UI module 120 to update the user interface 114 to include that string of characters within the user interface 114. Where that string of characters may be positioned or displayed within the user interface may be determined by which user interface component(s) have input focus. User interface 114, for example, includes several user interface components, including edit region 116C, suggestion region 118B, search element 118C, and output region 116A. In an example where suggestion region 118B has input focus, the computing device 110 may format and display within suggestion region 118B the string of characters corresponding to the input.

At times, in some examples, no user interface component will have input focus. In other examples, only one interface component will have input focus at a given time, and only certain types of user interface components might be allowed or be qualified to have input focus, such as text boxes or edit boxes. The computing device 110 may determine, in some examples, which user interface component has input focus by detecting which qualifying user interface component last received touch input by the user. In other words, when PSD 112 detects user input at a location of PSD 112 corresponding to a particular user interface component, computing device 110 may give that user interface component input focus (if it is allowed or qualified to have input focus). In other examples, the computing device 110 determines which user interface component has input focus by detecting which user interface component last received input from a cursor. In still other examples, computing device 110 may determine which user interface component has input focus based on a setting configured by an application executing on the computing device 110. For some user interface components, such as edit region 116C or suggestion region 118B, a flashing cursor 119 may in some examples be displayed within the interface component to provide a visual cue indicating that it has input focus.

In the search mode, keyboard application 122 may receive, from UI module 120, an indication of a user input selecting or attempting to select one or more graphical keys 118A. Keyboard application 122 may include a spatial model, a language model, or both, which may determine, based on locations of keys 118A, information about the input, and a sequence of characters, the most likely one or more letters, morphemes, words, and/or phrases that a user is trying to input based on the selection of keys 118A. Keyboard application 122 may cause UI module 120 to output the candidate letters, morphemes, words, and/or phrases within suggestion region 118B as the search query. In some examples, keyboard application 122 may cause UI module 120 to output multiple candidate letters, morphemes, words, and/or phrases, e.g., by expanding suggestion region 118B to present multiple candidate letters, morphemes, words, and/or phrases as individual lines of text.

Keyboard application 122 may receive, from UI module 120, an indication of a user input indicating completion of the search query, which may correspond to a user selecting a user interface element displayed at PSD 112, such as one of graphical keys 118A (e.g., the RETURN/SEARCH key illustrated in FIG. 1); one of the candidate letters, morphemes, words, and/or phrases displayed at suggestion region 118B; etc. In response, keyboard application 122 may determine the search query, e.g., as the letters, morphemes, words, and/or phrases displayed at suggestion region 118B at the time of the user input indicating completion of the search query or the selected one or the multiple candidate letters, morphemes, words, and/or phrases displayed in an expanded suggestion region 118B.

Keyboard application 122 may determine, based on user input, a search query. In some examples, the user input may include selection of one or more graphical keys 118A of graphical keyboard 116B. For example, keyboard application 122 may receive, from UI module 120, indications of user input at locations of PSD 112 corresponding to graphical keyboard 116B indicating a search query. As another example, the user input may include selection of a suggestion query included in query suggestion region 118D. That is, keyboard application 122 may receive, from UI module 120, an indication of the user input at a location of PSD 112 corresponding to one of the suggested search queries included in query suggestion region 118D.

In some examples, rather than receiving, from UI module 120, an indication of a user input selecting search element 118C to invoke the search mode then receiving, from UI module 120, an indication of a user input selecting or attempting to select one or more graphical keys 118A, keyboard application 122 may determine a predicted search query based on content of output region 116A, text edit region 116C, or both. For example, as illustrated in FIG. 1, output region 116A is an application such as a messaging or chat application, and illustrates communications from the user of computing device 110 (under "YOU") and communications from a user of another computing device (under "FRIEND"). In other examples, output region 116A may be another application user interface, such as a notes application, a web browser, a search application, a maps application, an email application, a text editor application, or any other application for which graphical keyboard 116B provides text input.

In some examples, keyboard application 122 may determine a predicted query based on content of the communication from the user of computing device 110. For example, FIG. 1 illustrates the content of the communication from the user of computing device 110 as being "Dinner tonight?" Based on the content of this communication, keyboard application 122 has determined a predicted search query "restaurants". In general, keyboard application 122 may determine one or more suggested queries based on one or more of a search history of a user associated with the computing device, a current messaging conversation, or a current context of the computing device. Keyboard application 122 may output an indication of the predicted search query to UI module 120, which may cause the predicted search query "restaurants" to be output at suggestion region 118B and/or query suggestion region 118D.

In some examples, keyboard application 122 may analyze only content of communications from the user of computing device 110 to determine a predicted search query. In other words, in some examples, keyboard application 122 may refrain from analyzing content of communications from a user of another computing device to determine a predicted search query. In other examples, keyboard application 122 may analyze content of communications from a user of another computing device (and received by computing device 110) to determine a predicted search query.

In some examples, keyboard application 122 may transmit instructions to UI module 120 to cause the predicted search query to be displayed with a different visual appearance than predicted characters, words or phrases. For example, keyboard application 122 transmit instructions to UI module 120 to cause the predicted search query to be displayed with a predetermined text color, font, font size, etc., or adjacent to or within a distinguishing user interface element, such as a text box, an underline, an icon or picture, etc. to visually differentiate a search query from predicted characters, words or phrases. This may allow a user of computing device 110 to easily distinguish between a predicted search query and predicted characters, words or phrases.

If the user decides to perform a search, the user may select suggestion region 118B or the predicted search query displayed at suggestion region 118B. Keyboard application 122 may receive an indication of the selection of suggestion region 118B or the predicted search query displayed at suggestion region 118B from UI module 120, and may determine that the search query is the predicted search query displayed at suggestion region 118B. In instances where the suggested queries are included within query suggestion region 118D, the user may provide input at a location of PSD 122 within query suggestion region 118D associated with one of the suggested queries. Keyboard application 122 may determine that the suggested query associated with the input is the search query the user wants to execute.

Computing device 110 then may transmit the search query to a search system. In response to receiving the search query, and based on content of the search query, the search system may perform a search. The search may include, for example, a search of webpages; a search of a semantic network including objects, facts, and relationships between the objects; an image search; a video search; a search localized to a location of the user of computing device 110; etc. The search system then may transmit at least one search result to computing device 110, and computing device 110 may receive the at least one search result. The search results may include textual information, images, videos, hyperlinks, etc.

Keyboard application 122 of computing device 110 may receive the search results and cause UI module 120 to output a visual representation of at least a portion of the search results in place of at least a portion of graphical keyboard 116B. For example, keyboard application 122 may cause UI module 120 to output the visual representation of at least a portion of the search results in place of at least some keys of graphical keys 118A.

In some examples, keyboard application 122 of computing device 110 may cause UI module 120 to output the visual representation as a card-based user interface element. The card-based user interface element may appear similar to a notecard, as one example, and may include a representation of a particular search result of the search results. The representation of the particular search result may include, for example, at least one of text, a picture, an icon, or the like.

Keyboard application 122 may generate a respective card-based user interface element for each respective search result of the search results. Keyboard application 122 may cause UI module 120 to output at least one card-based user interface element for display at a time, and UI module 120 may be configured to switch between respective card-based user interface elements in response to determining a user gesture, e.g., a swipe gesture. For example, keyboard application 122 may receive, from UI module 120, an indication of a swipe gesture initiated within the portion of the search results displayed within the graphical keyboard and, in response, output, for display within the graphical keyboard and in place of the portion of search results previously displayed, a graphical indication of a different portion of the search results. In this way, keyboard application 122 may enable a user to switch among search results within graphical keyboard 116B.

In some examples, keyboard application 122 may be configured to determine based on an indication of user input received from UI module 120, selection of a predetermined portion of the visual representation of a search result. In response to determining the selection, keyboard application 122 may be configured to automatically, without further user input, output an indication of information related to the search result to UI module 120, which is configured to insert the information related to the search result in text edit region 116C. The information related to the search result may include, for example, text, a hyperlink, an image, an icon, etc. In this way, computing device 110 is configured to allow one-gesture input of information from the search result to the text edit region 116C, enabling easy and efficient entry of information from the search result to the application for which graphical keyboard 116B is being used to input text.

In this way, the techniques of the disclosure may enable a computing device to provide a graphical keyboard with integrated search features that include display of a visual representation of at least a portion of search results in place of at least a portion of the graphical keyboard. Further, in some examples, the visual representation may include a card-based user interface element, and computing device 110 may be configured to output different card-based user interface elements, corresponding to different search results determined based on the search query, in response to receiving an indication of a user input, such as a swipe gesture. Additionally, computing device 110 may be configured to determine, based on user input, selection of a predetermined portion of the visual representation of the at least a portion (e.g., a search result) of the search results and, automatically, without further user input, insert, in text edit region 116C displayed adjacent to graphical keyboard 116B, information related to the at least a portion (e.g., a search result) of the search results.

Figure 2:
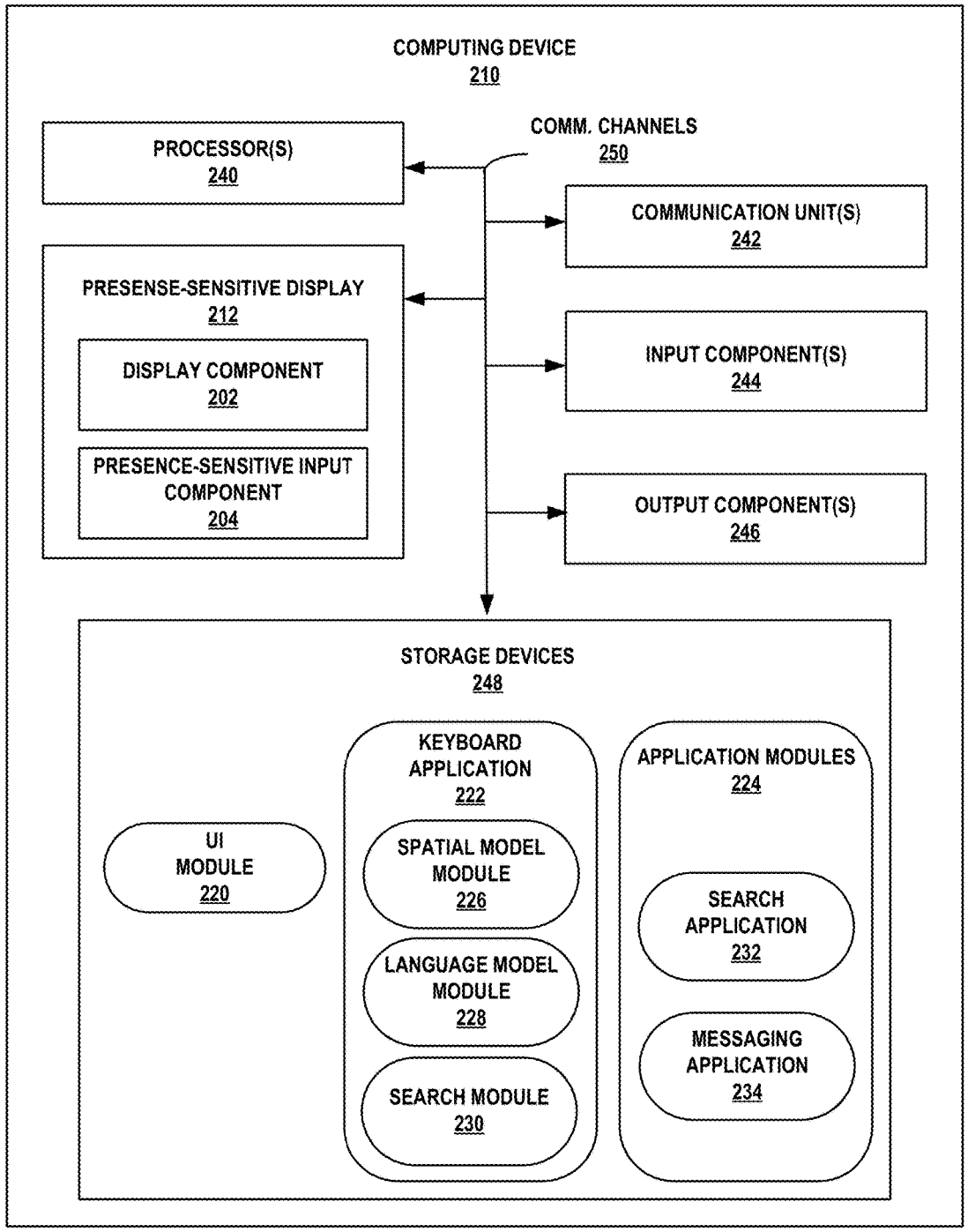
FIG. 2 is a block diagram illustrating an example computing device that is configured to present a graphical keyboard with integrated search features, in accordance with one or more aspects of the present disclosure.

FIG. 2 is a block diagram illustrating computing device 210 as an example computing device that is configured to present a graphical keyboard with integrated search features, in accordance with one or more aspects of the present disclosure. Computing device 210 of FIG. 2 is described below as an example of computing device 110 of FIG. 1. FIG. 2 illustrates only one particular example of computing device 210, and many other examples of computing device 210 may be used in other instances and may include a subset of the components included in example computing device 210 or may include additional components not shown in FIG. 2.

As shown in the example of FIG. 2, computing device 210 includes PSD 212, one or more processors 240, one or more communication units 242, one or more input components 244, one or more output components 246, and one or more storage components 248. Presence-sensitive display 212 includes display component 202 and presence-sensitive input component 204. Storage components 248 of computing device 210 include UI module 220, keyboard application 222, and one or more application modules 224. Keyboard application 222 may include spatial model ("SM") module 226, language model ("LM") module 228, and search module 230. Application modules 224 may include search application 232 and messaging application 234. Communication channels 250 may interconnect each of the components 212, 240, 242, 244, 246, and 248 for inter-component communications (physically, communicatively, and/or operatively). In some examples, communication channels 250 may include a system bus, a network connection, an inter-process communication data structure, or any other method for communicating data.

One or more communication units 242 of computing device 210 may communicate with external devices via one or more wired and/or wireless networks by transmitting and/or receiving network signals on the one or more networks. Examples of communication units 242 include a network interface card (e.g. such as an Ethernet card), an optical transceiver, a radio frequency transceiver, a GPS receiver, or any other type of device that can send and/or receive information. Other examples of communication units 242 may include short wave radios, cellular data radios, wireless network radios, as well as universal serial bus (USB) controllers.

One or more input components 244 of computing device 210 may receive input. Examples of input are tactile, audio, and video input. Input components 242 of computing device 210, in one example, includes a presence-sensitive input device (e.g., a touch sensitive screen, a PSD), mouse, keyboard, voice responsive system, video camera, microphone or any other type of device for detecting input from a human or machine. In some examples, input components 242 may include one or more sensor components one or more location sensors (GPS components, Wi-Fi components, cellular components), one or more temperature sensors, one or more movement sensors (e.g., accelerometers, gyros), one or more pressure sensors (e.g., barometer), one or more ambient light sensors, and one or more other sensors (e.g., microphone, camera, infrared proximity sensor, hygrometer, and the like). Other sensors may include a heart rate sensor, magnetometer, glucose sensor, hygrometer sensor, olfactory sensor, compass sensor, step counter sensor, to name a few other non-limiting examples.

One or more output components 246 of computing device 110 may generate output. Examples of output are tactile, audio, and video output. Output components 246 of computing device 210, in one example, includes a PSD, sound card, video graphics adapter card, speaker, cathode ray tube (CRT) monitor, liquid crystal display (LCD), or any other type of device for generating output to a human or machine.

PSD 212 of computing device 210 is similar to PSD 112 of computing device 110 and includes display component 202 and presence-sensitive input component 204. Display component 202 may be a screen at which information is displayed by PSD 212 and presence-sensitive input component 204 may detect an object at and/or near display component 202. As one example range, presence-sensitive input component 204 may detect an object, such as a finger or stylus that is within two inches or less of display component 202. Presence-sensitive input component 204 may determine a location (e.g., an [x, y] coordinate) of display component 202 at which the object was detected. In another example range, presence-sensitive input component 204 may detect an object six inches or less from display component 202 and other ranges are also possible. Presence-sensitive input component 204 may determine the location of display component 202 selected by a user's finger using capacitive, inductive, and/or optical recognition techniques. In some examples, presence-sensitive input component 204 also provides output to a user using tactile, audio, or video stimuli as described with respect to display component 202. In the example of FIG. 2, PSD 212 may present a user interface (such as graphical user interface 114 of FIG. 1).

While illustrated as an internal component of computing device 210, PSD 212 may also represent and an external component that shares a data path with computing device 210 for transmitting and/or receiving input and output. For instance, in one example, PSD 212 represents a built-in component of computing device 210 located within and physically connected to the external packaging of computing device 210 (e.g., a screen on a mobile phone). In another example, PSD 212 represents an external component of computing device 210 located outside and physically separated from the packaging or housing of computing device 210 (e.g., a monitor, a projector, etc. that shares a wired and/or wireless data path with computing device 210).

PSD 212 of computing device 210 may detect two-dimensional and/or three-dimensional gestures as input from a user of computing device 210. For instance, a sensor of PSD 212 may detect a user's movement (e.g., moving a hand, an arm, a pen, a stylus, etc.) within a threshold distance of the sensor of PSD 212. PSD 212 may determine a two or three dimensional vector representation of the movement and correlate the vector representation to a gesture input (e.g., a hand-wave, a pinch, a clap, a pen stroke, etc.) that has multiple dimensions. In other words, PSD 212 can detect a multi-dimension gesture without requiring the user to gesture at or near a screen or surface at which PSD 212 outputs information for display. Instead, PSD 212 can detect a multi-dimensional gesture performed at or near a sensor which may or may not be located near the screen or surface at which PSD 212 outputs information for display.

One or more processors 240 may implement functionality and/or execute instructions associated with computing device 210. Examples of processors 240 include application processors, display controllers, auxiliary processors, one or more sensor hubs, and any other hardware configure to function as a processor, a processing unit, or a processing device. Modules 220, 222, 224, 226, 228, 230, 232, and 234 may be operable by processors 240 to perform various actions, operations, or functions of computing device 210. For example, processors 240 of computing device 210 may retrieve and execute instructions stored by storage components 248 that cause processors 240 to perform the operations modules 220, 222, 224, 226, 228, 230, 232, and 234. The instructions, when executed by processors 240, may cause computing device 210 to store information within storage components 248.

One or more storage components 248 within computing device 210 may store information for processing during operation of computing device 210 (e.g., computing device 210 may store data accessed by modules 220, 222, 224, 226, 228, 230, 232, and 234 during execution at computing device 210). In some examples, storage component 248 is a temporary memory, meaning that a primary purpose of storage component 248 is not long-term storage. Storage components 248 on computing device 210 may be configured for short-term storage of information as volatile memory and therefore not retain stored contents if powered off. Examples of volatile memories include random access memories (RAM), dynamic random access memories (DRAM), static random access memories (SRAM), and other forms of volatile memories known in the art.

Storage components 248, in some examples, also include one or more computer-readable storage media. Storage components 248 in some examples include one or more non-transitory computer-readable storage mediums. Storage components 248 may be configured to store larger amounts of information than typically stored by volatile memory. Storage components 248 may further be configured for long-term storage of information as non-volatile memory space and retain information after power on/off cycles. Examples of non-volatile memories include magnetic hard discs, optical discs, floppy discs, flash memories, or forms of electrically programmable memories (EPROM) or electrically erasable and programmable (EEPROM) memories. Storage components 248 may store program instructions and/or information (e.g., data) associated with modules 220, 222, 224, 226, 228, 230, 232, and 234. Storage components

248 may include a memory configured to store data or other information associated with modules 220, 222, 224, 226, 228, 230, 232, and 234.

UI module 220 may include all functionality of UI module 120 of computing device 110 of FIG. 1 and may perform similar operations as UI module 120 for managing a user interface (e.g., user interface 114) that computing device 210 provides at presence-sensitive display 212 for handling input from a user. For example, UI module 220 of computing device 210 may query keyboard application 222 for a keyboard layout (e.g., an English language QWERTY keyboard, etc.). UI module 220 may transmit a request for a keyboard layout over communication channels 250 to keyboard application 222. Keyboard application 222 may receive the request and reply to UI module 220 with data associated with the keyboard layout. UI module 220 may receive the keyboard layout data over communication channels 250 and use the data to generate a user interface. UI module 220 may transmit a display command and data over communication channels 250 to cause PSD 212 to present the user interface at PSD 212.

In some examples, UI module 220 may receive an indication of one or more user inputs detected at PSD 212 and may output information about the user inputs to keyboard application 222. For example, PSD 212 may detect a user input and send data about the user input to UI module 220. UI module 220 may generate one or more touch events based on the detected input. A touch event may include information that characterizes user input, such as a location component (e.g., [x,y] coordinates) of the user input, a time component (e.g., when the user input was received), a force component (e.g., an amount of pressure applied by the user input), or other data (e.g., speed, acceleration, direction, density, etc.) about the user input.

Based on location information of the touch events generated from the user input, UI module 220 may determine that the detected user input is associated the graphical keyboard. UI module 220 may send an indication of the one or more touch events to keyboard application 222 for further interpretation. Keyboard application 222 may determine, based on the touch events received from UI module 220, that the detected user input represents an initial selection of one or more keys of the graphical keyboard.

Application modules 224 represent all the various individual applications and services executing at and accessible from computing device 210 that may rely on a graphical keyboard having integrated search features. A user of computing device 210 may interact with a graphical user interface associated with one or more application modules 224 to cause computing device 210 to perform a function. While application modules 224 is shown in FIG. 2 as including search application 232 and messaging application 234, application modules 224, numerous examples of application modules 224 may exist and include, a fitness application, a calendar application, a personal assistant or prediction engine, a search application, a map or navigation application, a transportation service application (e.g., a bus or train tracking application), a social media application, a game application, an e-mail application, a chat or messaging application, an Internet browser application, or any and all other applications that may execute at computing device 210.

Keyboard application 222 may include all functionality of keyboard application 122 of computing device 110 of FIG. 1 and may perform similar operations as keyboard application 122 for providing a graphical keyboard having integrated search features. Keyboard application 222 may include various submodules, such as SM module 226, LM module 228, and search module 230, which may perform the functionality of keyboard application 222.

SM module 226 may receive one or more touch events as input, and output a character or sequence of characters that likely represents the one or more touch events, along with a degree of certainty or spatial model score indicative of how likely or with what accuracy the one or more characters define the touch events. In other words, SM module 226 may infer touch events as a selection of one or more keys of a keyboard and may output, based on the selection of the one or more keys, a character or sequence of characters.

When keyboard application 222 operates in text-entry mode as opposed to search mode, LM module 228 may receive a character or sequence of characters as input, and output one or more candidate characters, words, or phrases that LM module 228 identifies from a lexicon as being potential replacements for a sequence of characters that LM module 228 receives as input for a given language context (e.g., a sentence in a written language). Keyboard application 222 may cause UI module 220 to present one or more of the candidate words at suggestion regions 118B and/or 118D of user interface 114.

The lexicon of computing device 210 may include a list of words within a written language vocabulary (e.g., a dictionary). For instance, the lexicon may include a database of words (e.g., words in a standard dictionary and/or words added to a dictionary by a user or computing device 210. LM module 228 may perform a lookup in the lexicon, of a character string, to identify one or more letters, words, and/or phrases that include parts or all of the characters of the character string. For example, LM module 228 may assign a language model probability or a similarity coefficient (e.g., a Jaccard similarity coefficient) to one or more candidate words located at a lexicon of computing device 210 that include at least some of the same characters as the inputted character or sequence of characters. The language model probability assigned to each of the one or more candidate words indicates a degree of certainty or a degree of likelihood that the candidate word is typically found positioned subsequent to, prior to, and/or within, a sequence of words (e.g., a sentence) generated from text input detected by presence-sensitive input component 204 prior to and/or subsequent to receiving the current sequence of characters being analyzed by LM module 228. In response to determining the one or more candidate words, LM module 228 may output the one or more candidate words from lexicon data stores 260A that have the highest similarity coefficients.

Search module 230 of keyboard application 222 may perform integrated search functions on behalf of keyboard application 222. That is, when invoked (e.g., in response to a user of computing device 210 selecting selectable element 218C of user interface 114), keyboard application 222 may operate in search mode where keyboard application 222 enables computing device 210 to perform search functions from within graphical keyboard 118A.

When keyboard application 222 operates in search mode, search module 230 may receive a character or sequence of characters or other information as input, and output one or more query suggestions that the search module 230 identifies based on the input. The information that the search module 230 receives as input may include characters or a sequence of characters, and in some examples, may also include information about the current state of the application that the user is using, as well as other information, such as information from the application that is relying on keyboard application 222 (e.g., recent texts, pictures, geolocation data and the like) and contextual information associated with the user and computing device 210. Search module 230 may use this information to generate one or more suggested queries. Keyboard application 222 may cause UI module 220 to present one or more of the suggested queries within the query suggestion region 118D of user interface 114.

In some examples, search model 230 may further rely on a current context of computing device 210 to determine a suggested query. As used herein, a current context specifies the characteristics of the physical and/or virtual environment of a computing device, such as computing device 210, and a user of the computing device, at a particular time. In addition, the term "contextual information" is used to describe any information that can be used by a computing device to define the virtual and/or physical environmental characteristics that the computing device, and the user of the computing device, may experience at a particular time.

Examples of contextual information are numerous and may include: sensor information obtained by sensors (e.g., position sensors, accelerometers, gyros, barometers, ambient light sensors, proximity sensors, microphones, and any other sensor) of computing device 210, communication information (e.g., text based communications, audible communications, video communications, etc.) sent and received by communication modules of computing device 210, and application usage information associated with applications executing at computing device 210 (e.g., application data associated with applications, Internet search histories, text communications, voice and video communications, calendar information, social media posts and related information, etc.). Further examples of contextual information include signals and information obtained from transmitting devices that are external to computing device 210.

In some examples, computing device 210 may initiate a search in response to different types of input. For example, keyboard application 222 may initiate a search in response to detecting user input at a location at which PSD 212 presents a suggested query within the query suggestion region 118D or elsewhere. This input may generally correspond to the user selecting one of the displayed suggested queries. In another example, keyboard application 222, while operating in search mode, may initiate a search in response to detecting user input at locations at which PSD 212 presents graphical keys 118A followed by input at a location at which PSD 212 presents a "return" or "search" or "send" key. Such input may generally correspond to the user typing a search query using the graphical keyboard 116B and hitting "return" without selecting a suggested search query.

Responsive to detecting user input that causes computing device 210 to initiate a search, the search module 230 within the keyboard application 222 may invoke a search. Keyboard application 222 may invoke a search using any one of a number of different techniques. For example, keyboard application 222 may invoke the search by sending, to search application 232, an indication of the search query. In such examples, keyboard application 222 may receive search results from search application 232. As another example, keyboard application 222 may invoke the search by at least executing a search of content stored at the computing device such that the search results only include information stored at the computing device. The information stored at the computing device includes one or more of contact information, image information, audio information, video information, message history information, search history information (e.g., previous search queries input to the computing device, previous search queries input by a user associated with the computing device while using a different computing device, etc.), application usage information (e.g., usage amount, usage time, usage location, usage patterns, etc.), device usage information (e.g., usage amount, usage time, usage location, usage patterns, etc.), etc.

In various instances, keyboard application 222 may invoke the search by using search functionality provided by a different application currently executing at computing device 210. The different application may be considered as currently executing at computing device 210 if, for example, the different provides at least a portion of a graphical user interface currently being displayed by computing device 210. As another example, different application may be considered as currently executing at computing device 210 if at least a portion of the application is resident in a volatile memory of computing device 210. In some instances, keyboard application 222 may provide information (e.g., inputted characters, emoji, search results, etc.) to the different application. For example, if messaging application 234 includes search functionality in addition to messaging functionality, keyboard application 222 may provide an indication of the search query to messaging application 234 and receive search results from messaging application 234. In instances where keyboard application 222 utilizes search functionality provided by the different application, keyboard application 222 may invoke the search by, for example, sending, the different application currently executing at the computing device, the search query. In such instances, keyboard application 222 may receive search results from the different application.

As another example, keyboard application 222 may invoke the search by sending at least an indication of the search query to a remote search system. The remote search system may be, for example, a database, server system, cloud-based computing system, or any other system capable of performing a search for information. The term "remote" indicates that the search system is distinct from and not included within computing device 210, but is reachable by computing device 210 via, for example, communication units 242. In instances where keyboard application 222 invokes the search by sending the indication of the search query to the remote system, keyboard application 222 may receive the search results from the remote search system.

While described as discrete ways of keyboard application 222 invoking the search, keyboard application may use any combination of the above described techniques for invoking a search. For example, keyboard application may execute a search of content stored at computing device while also sending an indication of the search query to a remote search system. In such examples, the search results may include information stored at computing device 210 and/or search results received form the remote search system. Regardless of how keyboard invokes the search, if search results become available, keyboard application 222 may then cause the UI module 220 to present search result information to the user by, in some examples, displaying search result information in user interface 114.

Keyboard application 222 may cause UI module 220 to present a portion of the search result information. For example, if there are more search results than can be simultaneously displayed by computing device 210, keyboard application 222 may select a portion of the search results to be output for display. In order to select the portion of the search results to be output, keyboard application 222 may rank the search results based on one or more criteria. For example, keyboard application 222 may rank the search results such that the higher ranked search results are determined to be more relevant to a current context of computing device 210 than the lower ranked search results. As another example, keyboard application 222 may rank the search results such that the higher ranked search results are determined to be more relevant to a user of computing device 220 based on a search history of the user than the lower ranked search results.

Figure 3:
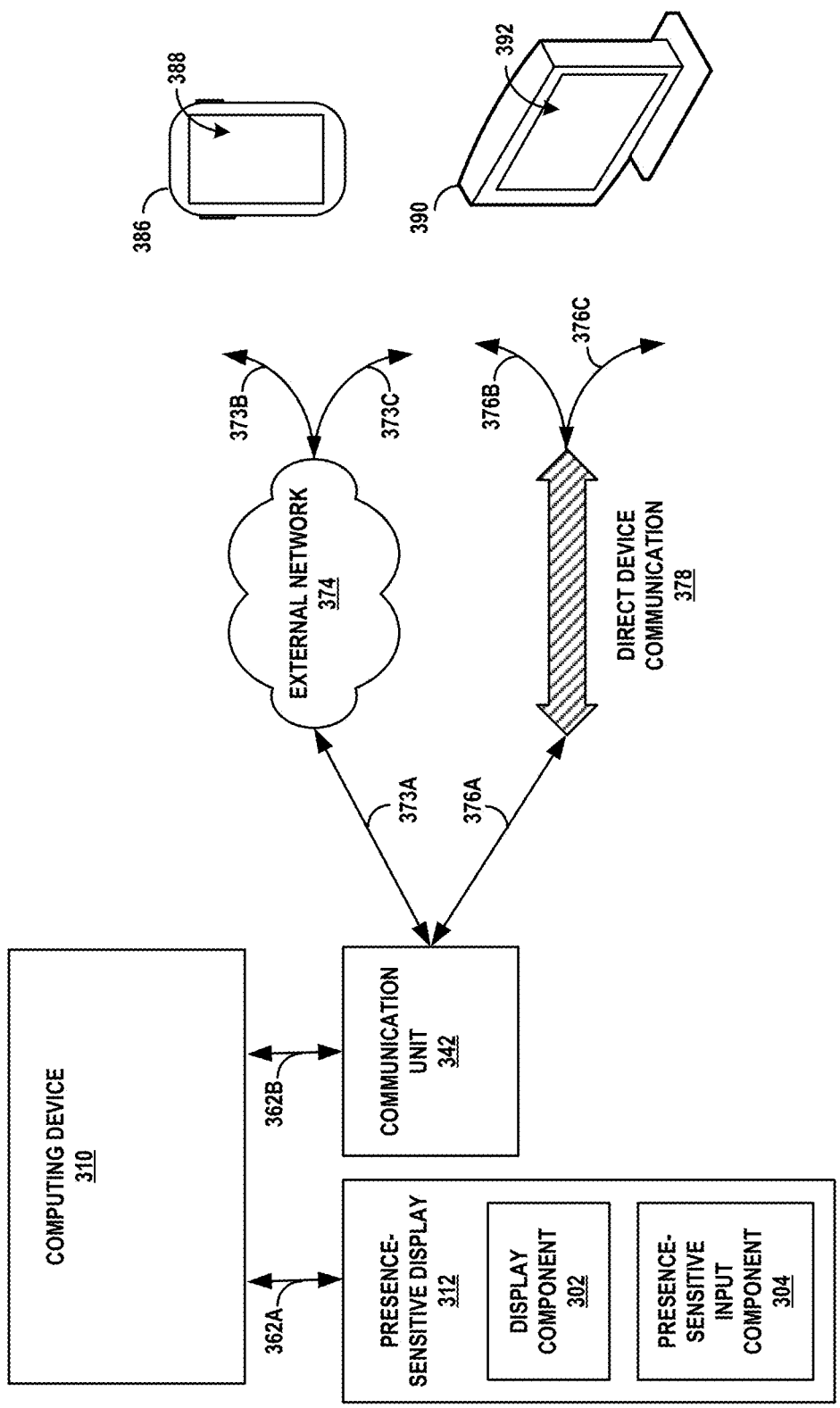
FIG. 3 is a block diagram illustrating an example computing device that outputs graphical content for display at a remote device, in accordance with one or more techniques of the present disclosure.

FIG. 3 is a block diagram illustrating an example computing device that outputs graphical content for display at a remote device, in accordance with one or more techniques of the present disclosure. Graphical content, generally, may include any visual information that may be output for display, such as text, images, a group of moving images, to name only a few examples. The example shown in FIG. 3 includes a computing device 310, a PSD 312, communication unit 342, mobile device 386, and visual display component 390. In some examples, PSD 312 may be a presence-sensitive display as described in FIGS. 1-2. Although shown for purposes of example in FIGS. 1 and 2 as a stand-alone computing device 110, a computing device such as computing device 310 may, generally, be any component or system that includes a processor or other suitable computing environment for executing software instructions and, for example, need not include a presence-sensitive display.

As shown in the example of FIG. 3, computing device 310 may be a processor that includes functionality as described with respect to processors 240 in FIG. 2. In such examples, computing device 310 may be operatively coupled to PSD 312 by a communication channel 362A, which may be a system bus or other suitable connection. Computing device 310 may also be operatively coupled to communication unit 342, further described below, by a communication channel 362B, which may also be a system bus or other suitable connection. Although shown separately as an example in FIG. 3, computing device 310 may be operatively coupled to PSD 312 and communication unit 342 by any number of one or more communication channels.

In other examples, such as illustrated previously by computing device 110 in FIGS. 1-2, a computing device may refer to a portable or mobile device such as mobile phones (including smart phones), laptop computers, etc. In some examples, a computing device may be a desktop computer, tablet computer, smart television platform, camera, personal digital assistant (PDA), server, or mainframes.

PSD 312 may include display component 302 and presence-sensitive input component 304. Display component 302 may, for example, receive data from computing device 310 and display the graphical content. In some examples, presence-sensitive input component 304 may determine one or more user inputs (e.g., continuous gestures, multi-touch gestures, single-touch gestures) at PSD 312 using capacitive, inductive, and/or optical recognition techniques and send indications of such user input to computing device 310 using communication channel 362A. In some examples, presence-sensitive input component 304 may be physically positioned on top of display component 302 such that, when a user positions an input unit over a graphical element displayed by display component 302, the location at which presence-sensitive input component 304 corresponds to the location of display component 302 at which the graphical element is displayed.

As shown in FIG. 3, computing device 310 may also include and/or be operatively coupled with communication unit 342. Communication unit 342 may include functionality of communication unit 242 as described in FIG. 2. Examples of communication unit 342 may include a network interface card, an Ethernet card, an optical transceiver, a radio frequency transceiver, or any other type of device that can send and receive information. Other examples of such communication units may include Bluetooth, 3G, and WiFi radios, Universal Serial Bus (USB) interfaces, etc. Computing device 310 may also include and/or be operatively coupled with one or more other devices (e.g., input devices, output components, memory, storage devices) that are not shown in FIG. 3 for purposes of brevity and illustration.

FIG. 3 also illustrates mobile device 386 and visual display component 390. Mobile device 386 and visual display component 390 may each include computing and connectivity capabilities. Examples of mobile device 386 may include e-reader devices, convertible notebook devices, hybrid slate devices, etc. Examples of visual display component 390 may include other devices such as televisions, computer monitors, etc. In some examples, visual display component 390 may be a vehicle cockpit display or navigation display (e.g., in an automobile, aircraft, or some other vehicle). In some examples, visual display component 390 may be a home automation display or some other type of display that is separate from computing device 310.

As shown in FIG. 3, mobile device 386 may include a presence-sensitive display 388. Visual display component 390 may include a presence-sensitive display 392. Presence-sensitive displays 388, 392 may include a subset of functionality or all of the functionality of presence-sensitive display 112, 212, and/or 312 as described in this disclosure. In some examples, presence-sensitive displays 388, 392 may include additional functionality. In any case, presence-sensitive display 392, for example, may receive data from computing device 310 and display the graphical content. In some examples, presence-sensitive display 392 may determine one or more user inputs (e.g., continuous gestures, multi-touch gestures, single-touch gestures) at projector screen using capacitive, inductive, and/or optical recognition techniques and send indications of such user input using one or more communication units to computing device 310.

As described above, in some examples, computing device 310 may output graphical content for display at PSD 312 that is coupled to computing device 310 by a system bus or other suitable communication channel. Computing device 310 may also output graphical content for display at one or more remote devices, such as mobile device 386, and visual display component 390. For instance, computing device 310 may execute one or more instructions to generate and/or modify graphical content in accordance with techniques of the present disclosure. Computing device 310 may output the data that includes the graphical content to a communication unit of computing device 310, such as communication unit 342. Communication unit 342 may send the data to one or more of the remote devices, such as mobile device 386, and/or visual display component 390. In this way, computing device 310 may output the graphical content for display at one or more of the remote devices. In some examples, one or more of the remote devices may output the graphical content at a presence-sensitive display that is included in and/or operatively coupled to the respective remote devices.

In some examples, computing device 310 may not output graphical content at PSD 312 that is operatively coupled to computing device 310. In other examples, computing device 310 may output graphical content for display at both a PSD 312 that is coupled to computing device 310 by communication channel 362A, and at one or more remote devices. In such examples, the graphical content may be displayed substantially contemporaneously at each respective device. In some examples, graphical content generated by computing device 310 and output for display at PSD 312 may be different than graphical content display output for display at one or more remote devices.

Computing device 310 may send and receive data using any suitable communication techniques. For example, computing device 310 may be operatively coupled to external network 374 using network link 373A. Each of the remote devices illustrated in FIG. 3 may be operatively coupled to network external network 374 by one of respective network links 373B or 373C. External network 374 may include network hubs, network switches, network routers, etc., that are operatively inter-coupled thereby providing for the exchange of information between computing device 310 and the remote devices illustrated in FIG. 3. In some examples, network links 373A-373C may be Ethernet, ATM or other network connections. Such connections may be wireless and/or wired connections.

In some examples, computing device 310 may be operatively coupled to one or more of the remote devices included in FIG. 3 using direct device communication 378. Direct device communication 378 may include communications through which computing device 310 sends and receives data directly with a remote device, using wired or wireless communication. That is, in some examples of direct device communication 378, data sent by computing device 310 may not be forwarded by one or more additional devices before being received at the remote device, and vice-versa. Examples of direct device communication 378 may include Bluetooth, Near-Field Communication, Universal Serial Bus, WiFi, infrared, etc. One or more of the remote devices illustrated in FIG. 3 may be operatively coupled with computing device 310 by communication links 376A-376C. In some examples, communication links 376A-376C may be connections using Bluetooth, Near-Field Communication, Universal Serial Bus, infrared, etc. Such connections may be wireless and/or wired connections.

In accordance with techniques of the disclosure, computing device 310 may be operatively coupled to visual display component 390 using external network 374. Computing device 310 may output a graphical keyboard for display at PSD 312. For instance, computing device 310 may send data that includes a representation of the graphical keyboard to communication unit 342. Communication unit 342 may send the data that includes the representation of the graphical keyboard to visual display component 390 using external network 374. Visual display component 390, in response to receiving the data using external network 374, may cause PSD 312 to output the graphical keyboard. In response to receiving a user input at PSD 312 to select one or more keys of the keyboard, visual display device 130 may send an indication of the user input to computing device 310 using external network 374. Communication unit 342 of may receive the indication of the user input, and send the indication to computing device 310.

Computing device 310 may select, based on the user input, one or more keys or user interface elements (e.g., a suggested or predicted search query). Computing device 310 may determine, based on the selection of one or more keys or user interface elements, a search query. In some examples, computing device 310 may transmit, to a search system, the search query. Responsive to receiving the search query, based on the search query, the search system may determine at least one search result. The search system may transmit the at least search result to computing device 310, which may receive the at least one search result. Computing device 310 may output a representation of an updated graphical user interface including an updated graphical keyboard in which at least a portion of the search results (e.g., a search result) is displayed instead of at least a portion of the graphical keyboard (e.g., at least one graphical key of the graphical keyboard). Communication unit 342 may receive the representation of the updated graphical user interface and may send the send the representation to visual display component 390, such that visual display component 390 may cause PSD 312 to output the updated graphical keyboard, including at least a portion of the search results (e.g., a search result) displayed instead of at least a portion of the graphical keyboard (e.g., at least one graphical key of the graphical keyboard).

Figure 4:
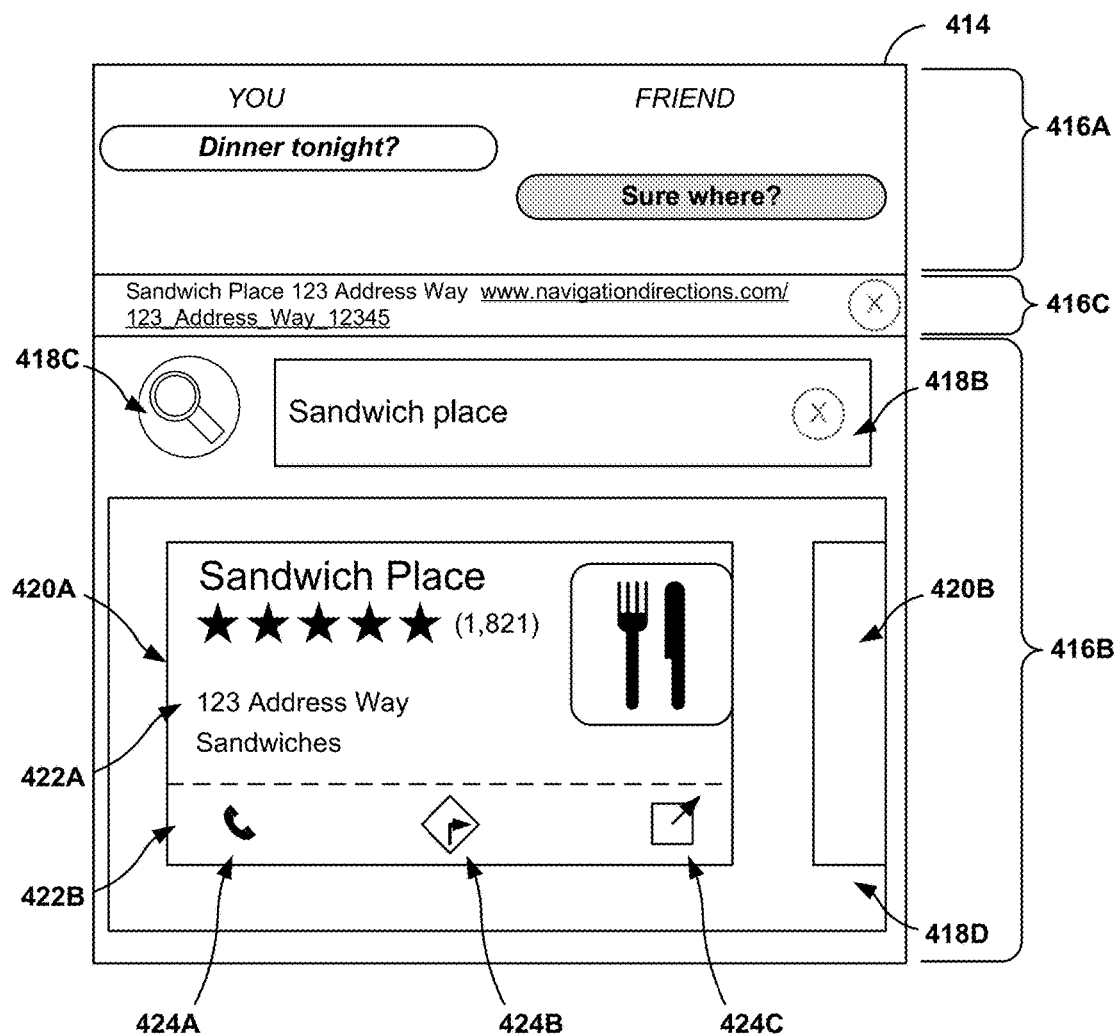
FIG. 4 is a conceptual diagram illustrating an example graphical user interface 414 of an example computing device that is configured to present a graphical keyboard with integrated search features, in accordance with one or more aspects of the present disclosure.

FIG. 4 is a conceptual diagram illustrating an example graphical user interface 414 of an example computing device that is configured to present a graphical keyboard with integrated search features, in accordance with one or more aspects of the present disclosure. However, many other examples of graphical user interfaces may be used in other instances. Graphical user interface 414 may correspond to a graphical user interface displayed by computing devices 110 or 210 of FIGS. 1 and 2 respectively. FIG. 4 is described below in the context of computing device 110.

Graphical user interface 414 includes a view of graphical keyboard 416B in which at least a portion of the plurality of keys (in this example, all of the keys) has been replaced by at least a portion of search results returned in response to a search query. Graphical user interface 414 includes output region 416A, text edit region 416C, and graphical keyboard 416B. Graphical keyboard 416B includes suggestion region 418B, search element 418C, and search results region 418D. In the view illustrated in FIG. 4, suggestion region 418B is configured to display an input search query, "Sandwich place".

Search results region 418D displays a visual representation of at least one search result received by computing device 110 in response to the search query. In some examples, the visual representation of the at least one search result may be a card-based user interface element 420A. Card-based user interface element 420A may appear similar to a notecard, and may include a visual representation of a particular search result of the search results. The representation of the particular search result may include, for example, at least one of text, a picture, an icon, or the like. For example, card-based user interface element 420A includes text indicating an answer to the search query. In FIG. 4, the text indicating an answer to the search query includes a restaurant name ("Sandwich Place"), restaurant rating (5 stars), a number of reviews ("1,821"), an address ("123 Address Way"), a restaurant type ("Sandwiches"), and an image (such as a picture of Sandwich Place).

Card-based user interface element 420A includes a first predetermined portion 422A and a second predetermined portion 422B. The first predetermined portion 422A of card-based user interface element 420A (the visual representation of a first search result) may include a representation of content of the particular search result, such as text, an image associated with the particular search result, an icon associated with the particular search result, etc. In FIG. 4, the text indicating an answer to the search query includes a restaurant name ("Sandwich Place"), restaurant rating (5 stars), a number of reviews ("1,821"), an address ("123 Address Way"), a restaurant type ("Sandwiches"), and an image (such as a picture of Sandwich Place).

In some examples, keyboard module 122 may be configured to determine, based on an indication of user input at PSD 112 received from UI module 120 (e.g., an indication of a touch event), selection of first predetermined portion 422A. In response to determining the selection of first predetermined portion 422A, keyboard module 122 may be configured to automatically, without further user input, output an indication of information related to of the search result to UI module 120 and cause UI module 120 to insert the information related to the search result in text edit region 416C. In this way, keyboard module 122 is configured to allow one-gesture input of information from the search result to the text edit region 416C, enabling easy and efficient entry of information from the search result to the application for which graphical keyboard 416B is being used to input text.

The information related to the search result may include, for example, textual information related to the selected search result. For example, as shown in FIG. 4, the information related to the selected search result includes a text answer to the search query ("Sandwich Place 123 Address Way"). In the example of FIG. 4, the information related to the selected search result also includes a hyperlink to a website that provides directions to Sandwich Place, which may allow the user of computing device 110 or the user of the other computing device (e.g., "FRIEND" in FIG. 4) to select the hyperlink to access directions to Sandwich Place once the content in text edit region 416C is committed to output region 416A. In other examples, the information related to the selected search result may include an image (such as an image of Sandwich Place), an icon, etc.

Card-based user interface element 420A also includes second predetermined portion 422B, which is associated with one or more actions performed by an application other than graphical keyboard 416B. For example, second predetermined portion 422B includes multiple user interface elements (e.g., icons, images, text etc.) associated with respective actions, which, when selected by a user, causes UI module 120 to output the touch event to another application module to perform the indicated respective action.

In the example of FIG. 4, the user interface elements include phone icon 424A, navigation icon 424B, and go-to icon 424C. Phone icon 424A is associated with an action of opening a phone application and calling Sandwich Place (i.e., the establishment associated with the search result). Navigation icon 424B is associated with an action of opening a navigation or maps application and retrieving directions to Sandwich Place (i.e., the establishment associated with the search result). Go-to icon 424C is associated with an action of opening a new application related to the search result displayed in card-based user interface element 420A, such as a search application or a website from which the information in the search result was retrieved.

In response to receiving, from PSD 112, a touch event, UI module 120 or keyboard module 122 may determine selection of one of icons 424A-424C in the second predetermined portion 422B, and may transmit an indication of the selection of the one of icons 424A-424C to the associated application, which may perform the action associated with the selected one of icons 424A-424C. In this way, in addition to allowing insertion of information related to the search result into the application for which graphical keyboard 416B is being used to input text, keyboard module 122 may present a user with shortcuts to actions performed by other applications.

In some examples, computing device 110 may receive, from the search system, more than one search result in response to a search query. Keyboard module 122 may generate a respective card-based user interface element for each respective search result of the search results. In some examples, keyboard module 122 may cause search results region 418D to display more than one search result (e.g., more than one card-based user interface element 420A). For example, as shown in FIG. 4, keyboard module 122 may cause search results region 418D to display first card-based user interface element 420A and a portion of a second card-based user interface element 420B. The display of the portion of second card-based user interface element 420B may visually indicate to a user of computing device 110 that additional search results exist and may be viewed by navigating to the second card-based user interface element 420B. For example, keyboard module 122 may cause UI module 120 to switch from card-based user interface element 420A to second card-based user interface element 420B in response to determining a user gesture based on touch events, e.g., a swipe from right to left in FIG. 4. In this way, keyboard module 122 may enable a user to switch among search results within search results region 418D of graphical keyboard 116B. In some examples, keyboard module 122 may enable a user to switch among card-based user interface elements using swipes to different directions (e.g., right and left), and the card-based user interface elements may be conceptually arranged in a carousel.

Figure 5:
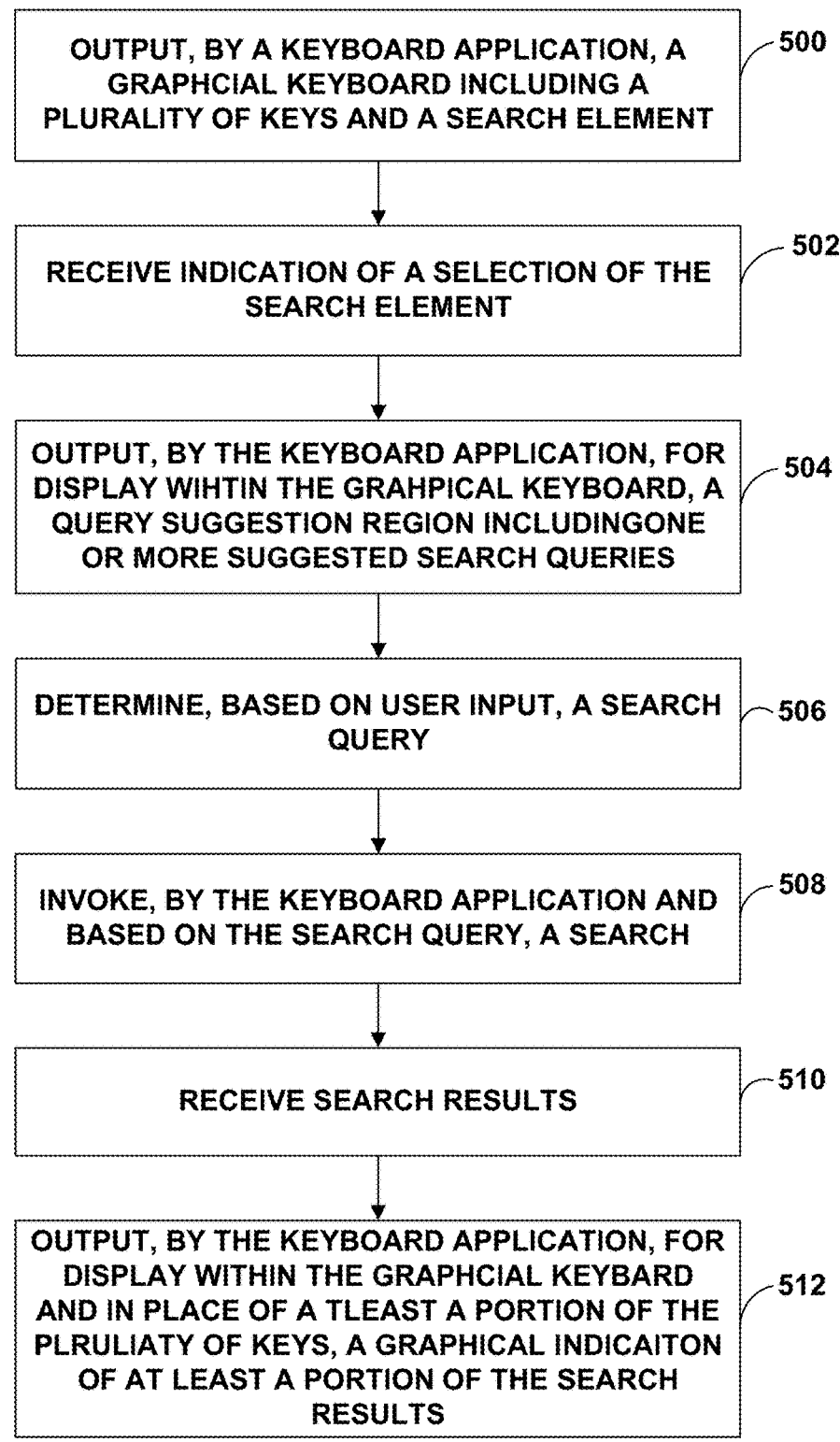
FIG. 5 is a flowchart illustrating example operations of a computing device that is configured to present a graphical keyboard with integrated search features, in accordance with one or more aspects of the present disclosure.

FIG. 5 is a flowchart illustrating example operations of a computing device that is configured to present a graphical keyboard with integrated search features, in accordance with one or more aspects of the present disclosure. The operations of FIG. 5 may be performed by one or more processors of a computing device, such as computing devices 110 of FIG. 1 or computing device 210 of FIG. 2. For purposes of illustration only, FIG. 5 is described below within the context of computing devices 110 of FIG. 1.

In operation, keyboard application 122 of computing device 110 may output a graphical keyboard 116B that includes plurality of keys 118A and search element 118C (500). Graphical keyboard 116B, in various instances, may also include suggestion region 118B, query suggestion region 118D, and/or a search results region. In some examples, graphical keyboard 116B may be part of a graphical user interface of a different application executing at computing device 110 (e.g., part of graphical user interface 114). That is, PSD 112 of computing device 110 may display graphical user interface 114 for an application, such as a messaging application, that includes graphical keyboard 116B output by keyboard application 122.

Keyboard application 122 may receive an indication of a selection of search element 118C included within the graphical keyboard 116B (502). For example, a user may provide an input at a location of PSD 112 associated with search element 116C. UI module 120 may may provide an indication of the selection of search element 118C to keyboard application 122.

Responsive to receiving the indication of the selection of the search element, keyboard application 122 may output, for display within graphical keyboard 116B, query suggestion region 118D including one or more suggested search queries (504). Keyboard application 122 may determine the which queries to include as the one or more suggested search queries based on a context of computing device 110, a search history of a user associated with computing device 110, text input provided at computing device 110 (e.g., as displayed within text edit region 116C of user interface 114), a suggested query included within suggestion region 118B, suggested words included within suggestion region 118B, etc.

Keyboard application 122 may determine, based on an indication of a user input detected by the computing device, a search query (506). For example, a user may select a suggested search query included within query suggestion region 118D, may select one or more keys from plurality of keys 118A as a text query, or speak a phase as a query. In instances where the user selects a suggested search query, keyboard application 122 determines that the selected search query is the search query. In instances where the user provides a query via selection of a portion of the plurality of keys 118A or provides voice input, keyboard application 122 determines the search query based on the selected keys or voice input.

Once keyboard application 122 determines the search query, keyboard application 122 may invoke, based on the search query, a search (508). In order to invoke the search, keyboard application 122 may execute directly execute a search, request that a search application installed at computing device 110 execute a search, request that a different application that includes search functionality execute a search, request that a remote search system perform a search, or any combination thereof. In various instances, a user may control whether keyboard application 122 may request a different application or the remote search system perform a search so as to limit the distribution of the particular search query.

Regardless of how keyboard application 122 invokes the search, in response to invoking the search, keyboard application 122 receive search results (510). The search results may be received from a database or other data store local to computing device 110 (e.g., in instances where keyboard application 122 performs a search for local information), received from a different application executing at computing device 110, from the remote search system, or from any combination thereof.

Keyboard application 122 may output, for display within graphical keyboard 116B and in place of at least a portion of plurality of keys 118A, a graphical indication of at least a portion of the search results (512). In some examples, the graphical indication of the at least one search result may be a card-based user interface element, which may appear similar to a notecard, and may include a visual representation of a particular search result of the search results. Keyboard module 122 may enable a user to switch among card-based user interface elements using swipes to different directions (e.g., right and left), and the card-based user interface elements may be conceptually arranged in a carousel.

The following numbered clauses may illustrate one or more aspects of the disclosure:

Example 1. A method comprising: outputting, by keyboard application executing at a computing device, for display, a graphical keyboard including a plurality of keys and a search element; receiving, by the keyboard application, an indication of a selection of the search element; responsive to receiving the indication of the selection of the search element, outputting, by the keyboard application, for display within the graphical keyboard, a query suggestion region including one or more suggested search queries; determining, by the keyboard application, based on an indication of a user input detected by the computing device, a search query; invoking, by the keyboard application and based on the search query, a search; responsive to invoking the search, receiving, by the keyboard application, search results; and outputting, by the keyboard application, for display within the graphical keyboard and in place of at least a portion of the plurality of keys, a graphical indication of at least a portion of the search results.

Example 2. The method of example 1, wherein: invoking the search comprises sending, by the keyboard application and to a search application executable by the computing device, an indication of the search query, and the search results are received from the search application.

Example 3. The method of any of examples 1-2, wherein: invoking the search comprises executing, by the keyboard application, a search of content stored at the computing device, and the search results only include information stored at the computing device Example 4. The method of example 3, wherein the information stored at the computing device includes one or more of contact information, image information, audio information, video information, message history information, search history information, application usage information, or device usage information.

Example 5. The method of any of examples 1-4, further comprising: while executing the keyboard application, executing, by the computing device, a different application, wherein the different application currently executing at the computing device outputs at least a portion of a currently displayed graphical user interface, wherein the different application includes search functionality, and wherein the keyboard application provides information to the different application for display within the graphical user interface, wherein invoking the search comprises sending, by the keyboard application and to the different application currently executing at the computing device, the search query, and wherein the search results are received by the keyboard application from the different application.

Example 6. The method of any of examples 1-5, wherein: invoking the search comprises sending an indication of the search query to a remote search system, and the search results are received from the remote search system.

Example 7. The method of any of examples 1-6, wherein invoking the search comprises: executing, by the keyboard application, a search of content stored at the computing device; and sending an indication of the search query to a remote search system, and wherein at least a portion of the search results are received from the remote search system.

Example 8. The method of example 7, further comprising: ranking, by the keyboard application, the search results; and selecting, by the keyboard application and based on the ranking, the portion of the search results to be output.

Example 9. The method of any of examples 1-8, further comprising: receiving, by the keyboard application, an indication of a user input selection a particular search result from the search results; and updating, by the keyboard application for display, the graphical keyboard to include an indication of the particular search result within a text edit region of the graphical keyboard.

Example 10. The method of any of examples 1-9, further comprising: receiving, by the keyboard application, an indication of a swipe gesture initiated within the portion of the search results displayed within the graphical keyboard; and outputting, by the graphical keyboard, for display within the graphical keyboard and in place of the portion of search results previously displayed, a graphical indication of a different portion of the search results.

Example 11. The method of any of examples 1-10, wherein the user input detected by the computing device includes a selection of one or more keys of the plurality of keys, and wherein determining the search query comprises determining, based on the selection of the one or more keys, the search query.

Example 12. The method of any of examples 1-11, wherein: the user input detected by the computing device comprises a selection of one of the one or more suggested search queries included in the query suggestion region, and the search query is the one of the one or more suggested search queries selected by the user input.

Example 13. The method of any of examples 1-12, further comprising: determining, by the keyboard application, the one or more suggested queries based on one or more of a search history of a user associated with the computing device, a current messaging conversation, or a current context of the computing device.

Example 14. The method of any of examples 1-13, further comprising: prior to receiving selection of search element: determining, by the keyboard application and based on a previous selection of one or more keys of the plurality of keys, a suggested query; and outputting, by the keyboard application, for display, the suggested query in the suggestion region of the graphical keyboard.

Example 15. The method of example 14, further comprising: after receiving the indication of the selection of the search element, outputting, by the keyboard application, for display, the suggested query as one of the one or more suggested queries included in the query suggestion region.

Example 16. The method of any of examples 1-15, wherein the keyboard application is downloaded from an online application store.

Example 17. The method of any of examples 1-16, wherein: the keyboard application executes as an extension to a different application currently executing at the computing device, and the graphical keyboard is output for display within a graphical user interface of the different application.

Example 18. A computing device comprising: one or more processors; a memory storing one or more applications including a keyboard application; and a presence-sensitive display, wherein the one or more processors execute the keyboard application to: output, for display by the presence-sensitive display, a graphical keyboard including a plurality of keys and a search element; receive an indication of a selection of the search element; responsive to receiving the indication of the selection of the search element, output, for display by the presence-sensitive display and within the graphical keyboard, a query suggestion region including one or more suggested search queries; determine, based on an indication of a user input detected by the computing device, a search query; invoke, based on the search query, a search; responsive to invoking the search, receive search results; and output, for display by the presence-sensitive display, within the graphical keyboard and in place of at least a portion of the plurality of keys, a graphical indication of at least a portion of the search results.

Example 19. The computing device of example 18, wherein the one or more processors execute the keyboard application to, prior to receiving selection of search element: determine, based on a previous selection of one or more keys of the plurality of keys, a suggested query; and output, for display by the presence-sensitive display, the suggested query in the suggestion region of the graphical keyboard.

Example 20. The computing device of example 19, wherein the one or more processors execute the keyboard application to, after receiving the indication of the selection of the search element: output, for display by the presence-sensitive display, the suggested query as one of the one or more suggested queries included in the query suggestion region.

Example 21. A computer-readable storage medium encoded with instructions that, when executed, cause one or more processors of a computing device to: output, for display, a graphical keyboard including a plurality of keys and a search element; receive an indication of a selection of the search element; responsive to receiving the indication of the selection of the search element, output, for display within the graphical keyboard, a query suggestion region including one or more suggested search queries; determine, based on an indication of a user input detected by the computing device, a search query; invoke, based on the search query, a search; responsive to invoking the search, receive search results; and output, for display within the graphical keyboard and in place of at least a portion of the plurality of keys, a graphical indication of at least a portion of the search results.

Example 22. A system comprising means for performing any of the methods of examples 1-17.

Example 23. A computing device comprising means for performing any of the methods of examples 1-17.

Example 24. A computer-readable storage medium comprising means for performing any of the methods of examples 1-17.

Throughout the disclosure, examples are described where a computing device and/or a computing system analyzes information (e.g., context, locations, speeds, search queries, etc.) associated with a computing device and a user of a computing device, only if the computing device receives permission from the user of the computing device to analyze the information. For example, in situations discussed below, before a computing device or computing system can collect or may make use of information associated with a user, the user may be provided with an opportunity to provide input to control whether programs or features of the computing device and/or computing system can collect and make use of user information (e.g., information about a user's current location, current speed, etc.), or to dictate whether and/or how to the device and/or system may receive content that may be relevant to the user. In addition, certain data may be treated in one or more ways before it is stored or used by the computing device and/or computing system, so that personally-identifiable information is removed. For example, a user's identity may be treated so that no personally identifiable information can be determined about the user, or a user's geographic location may be generalized where location information is obtained (such as to a city, ZIP code, or state level), so that a particular location of a user cannot be determined. Thus, the user may have control over how information is collected about the user and used by the computing device and computing system.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media, which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used may refer to any of the foregoing structure or any other structure suitable for implementation of the techniques described. In addition, in some aspects, the functionality described may be provided within dedicated hardware and/or software modules. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

Various examples have been described. These and other examples are within the scope of the following claims.

What is claimed is:

1. A method comprising:
outputting, by a first application executing at a computing device, a graphical user interface including a text edit region that includes uncommitted text input, and an output region that includes committed text input;
invoking, by the first application, a keyboard application executing at the computing device to provide a graphical keyboard within the graphical user interface;
outputting, by the keyboard application, for display adjacent to the text edit and output regions of the graphical user interface, the graphical keyboard, wherein the graphical keyboard includes a plurality of character keys, a word suggestion region and a search element, wherein the word suggestion region and the search element are each positioned above the plurality of character keys and below the text edit and output regions, wherein the word suggestion region includes a plurality of word suggestions based on the uncommitted text input displayed by the text edit region;
receiving, by the keyboard application, an indication of a selection of the search element;
responsive to receiving the indication of the selection of the search element, outputting, by the keyboard application, for display within the graphical keyboard, adjacent to the text edit and output regions of the graphical user interface, and in place of the word suggestion region, a query suggestion region including one or more suggested search queries;
while outputting the query suggestion region for display, receiving, by the keyboard application, an indication of a selection of one or more character keys from the plurality of character keys;
outputting, by the keyboard application, for display within the graphical keyboard, adjacent to the text edit and output regions of the graphical user interface, and in place of the query suggestion region, an updated query suggestion region including one or more characters selected in response to the selection of the one or more character keys;
determining, by the keyboard application, based on the one or more characters, one or more updated suggested search queries;
outputting, by the keyboard application, for display, the one or more updated suggested search queries in the updated query suggestion region;
receiving, by the keyboard application, an indication of a selection of one of one or more updated suggested search queries, the one of the one or more updated suggested search queries being a selected search query;
invoking, by the keyboard application and based on the selected search query, a search;
responsive to invoking the search, receiving, by the keyboard application, search results; and
outputting, by the keyboard application, for display within the graphical keyboard, adjacent to the text edit and output regions of the graphical user interface, and in place of a portion, but not all, of the plurality of character keys, a graphical indication of at least a portion of the search results.

2. The method of claim 1, wherein:
invoking the search comprises sending, by the keyboard application and to a search application executing at the computing device, an indication of the selected search query, and
the search results are received from the search application.

3. The method of claim 1, wherein:
invoking the search comprises executing, by the keyboard application, a search of content stored at the computing device, and
the search results only include information stored at the computing device.

4. The method of claim 3, wherein the information stored at the computing device includes one or more of contact information, image information, audio information, video information, message history information, search history information, application usage information, or device usage information.

5. The method of claim 1,
wherein the first application includes search functionality, and wherein the keyboard application provides information to the first application for display within the graphical user interface, wherein invoking the search comprises sending, by the keyboard application and to the first application, the selected search query, and wherein the search results are received by the keyboard application from the first application.

6. The method of claim 1, wherein:

invoking the search comprises sending an indication of the selected search query to a remote search system, and the search results are received from the remote search system.

7. The method of claim 1, wherein invoking the search comprises:

executing, by the keyboard application, a search of content stored at the computing device; and sending an indication of the selected search query to a remote search system, and wherein at least a portion of the search results are received from the remote search system.

8. The method of claim 7, further comprising:

ranking, by the keyboard application, the search results; and selecting, by the keyboard application and based on the ranking, the portion of the search results to be output.

9. The method of claim 1, further comprising:

while maintaining the text edit and output regions of the graphical user interface adjacent to the graphical keyboard:

receiving, by the keyboard application, an indication of a user input selection a particular search result from the search results; and updating, by the keyboard application for display, the graphical keyboard to include an indication of the particular search result within the text edit region of the graphical keyboard.

10. The method of claim 1, further comprising:

while maintaining the text edit and output regions of the graphical user interface adjacent to the graphical keyboard:

receiving, by the keyboard application, an indication of a swipe gesture initiated within the portion of the search results displayed within the graphical keyboard; and outputting, by the graphical keyboard, for display within the graphical keyboard and in place of the portion of search results previously displayed, a graphical indication of a different portion of the search results.

11. The method of claim 1, further comprising:

determining, by the keyboard application, the one or more suggested queries based on one or more of a search history of a user associated with the computing device, a current messaging conversation, or a current context of the computing device.

12. The method of claim 1, further comprising:

prior to receiving selection of search element:

determining, by the keyboard application and based on a previous selection of one or more keys of the plurality of keys, a suggested query; and outputting, by the keyboard application, for display, the suggested query in the suggestion region of the graphical keyboard.

13. The method of claim 12, further comprising:

after receiving the indication of the selection of the search element, outputting, by the keyboard application, for display, the suggested query as one of the one or more suggested queries included in the query suggestion region.

14. The method of claim 1, wherein the keyboard application is downloaded from an online application store.

15. The method of claim 1, wherein:

the keyboard application executes as an extension to the first application.

16. A computing device comprising:

one or more processors;

a memory storing one or more applications including a keyboard application and a first application that is different than the keyboard application; and a presence-sensitive display, wherein the one or more processors are configured execute the first application to:

output, for display at the presence-sensitive display, a graphical user interface including a text edit region that includes uncommitted text input, and an output region that includes committed text input: and invoke, the keyboard application to provide a graphical keyboard within the graphical user interface; and wherein the one or more processors are configured execute the keyboard application to:

output, for display adjacent to the text edit and output regions of the graphical user interface, the graphical keyboard, wherein the graphical keyboard includes a plurality of character keys, a word suggestion region and a search element, wherein the word suggestion region and the search element are each positioned above the plurality of keys and below the text edit and output regions, wherein the word suggestion region includes a plurality of word suggestions based on the uncommitted text input displayed by the text edit region;

receive an indication of a selection of the search element;

responsive to receiving the indication of the selection of the search element, output, for display within the graphical keyboard, adjacent to the text edit and output regions of the graphical user interface, and in place of the word suggestion region, a query suggestion region including one or more suggested search queries;

while outputting the query suggestion region for display, receive an indication of a selection of one or more character keys from the plurality of character keys;

output, for display within the graphical keyboard, adjacent to the text edit and output regions of the graphical user interface, and in place of the query suggestion region, an updated query suggestion region including one or more characters selected in response to the selection of the one or more character keys;

determine, based on the one or more characters, one or more updated suggested search queries;

output, for display, the one or more updated suggested search queries in the updated query suggestion region;

receive, an indication of a selection of one of one or more updated suggested search queries, the one of the one or more updated suggested search queries being a selected search query;

invoke, based on the selected search query, a search;

responsive to invoking the search, receive search results; and output, for display within the graphical keyboard, adjacent to the text edit and output regions of the graphical user interface, and in place of a portion, but not all of, the plurality of character keys, a graphical indication of at least a portion of the search results.

17. The computing device of claim 16, wherein the one or more processors are further configured to execute the keyboard application to, prior to receiving selection of the search element:
   determine, based on a previous selection of one or more keys of the plurality of keys, a suggested query; and
   output, for display by the presence-sensitive display, the suggested query in the suggestion region of the graphical keyboard.

18. The computing device of claim 17, wherein the one or more processors are further configured to execute the keyboard application to, after receiving the indication of the selection of the search element:
   output, for display by the presence-sensitive display, the suggested query as one of the one or more suggested queries included in the query suggestion region.

19. The computing device of claim 18, wherein the one or more processors are further configured to execute the keyboard application to, after receiving the indication of the selection of the search element:
   output, for display by the presence-sensitive display, the suggested query as one of the one or more suggested queries included in the query suggestion region.

20. A non-transitory computer-readable storage medium encoded with instructions that, when executed, cause one or more processors of a computing device to:
   execute a first application to:
      output, for display, a graphical user interface including a text edit region that includes uncommitted text input, and an output region that includes committed text input: and
      invoke a keyboard application to provide a graphical keyboard within the graphical user interface; and
   responsive to the first application invoking the keyboard application, execute the keyboard application to:
      output, for display adjacent to the text edit and output regions of the graphical user interface, the graphical keyboard, wherein the graphical keyboard includes a plurality of character keys, a word suggestion region and a search element, wherein the word suggestion region and the search element are each positioned above the plurality of keys and below the text edit and output regions, wherein the word suggestion region includes a plurality of word suggestions based on the uncommitted text input displayed by the text edit region;
      receive an indication of a selection of the search element;
      responsive to receiving the indication of the selection of the search element, output, for display within the graphical keyboard, adjacent to the text edit and output regions of the graphical user interface, and in place of the word suggestion region, a query suggestion region including one or more suggested search queries;
      while outputting the query suggestion region for display, receive an indication of a selection of one or more character keys from the plurality of character keys;
      output, for display within the graphical keyboard, adjacent to the text edit and output regions of the graphical user interface, and in place of the query suggestion region, an updated query suggestion region including one or more characters selected in response to the selection of the one or more character keys;
      determine, based on the one or more characters, one or more updated suggested search queries;
      output, for display, the one or more updated suggested search queries in the updated query suggestion region;
      receive, an indication of a selection of one of one or more updated suggested search queries, the one of the one or more updated suggested search queries being a selected search query;
      invoke, based on the selected search query, a search;
      responsive to invoking the search, receive search results; and
      output, for display within the graphical keyboard, adjacent to the text edit and output regions of the graphical user interface, and in place of a portion, but not all, of the plurality of character keys, a graphical indication of at least a portion of the search results.

21. The non-transitory computing readable storage medium of claim 20, wherein the instructions further cause the one or more processors to execute the keyboard application to:
   determine, based on a previous selection of one or more keys of the plurality of keys, a suggested query;
   output, for display, the suggested query in the suggestion region of the graphical keyboard; and
   after receiving the indication of the selection of the search element, output, for display, the suggested query as one of the one or more suggested queries included in the query suggestion region.

* * * * *